United States Patent
Zhang et al.

(10) Patent No.: US 11,026,155 B2
(45) Date of Patent: Jun. 1, 2021

(54) DISTRIBUTION OF SYSTEM INFORMATION IN A WIRELESS ACCESS TELECOMMUNICATIONS SYSTEM

(71) Applicants: Koninklijke KPN N.V., Rotterdam (NL); Nederlandse Organisatie voor Toegepast-Natuurwetenschappelijk Onderzoek TNO, 's-Gravenhage (NL)

(72) Inventors: Haibin Zhang, Voorburg (NL); Ljupco Jorguseski, Rijswijk (NL); Job Cornelis Oostveen, Haren (NL); Jacob Cornelis Van der Wal, Vaasen (NL)

(73) Assignees: Koninklijke KPN N.V., Rotterdam (NL); Nederlandse Organisatie voor Toegepast-Natuurwetenschappelijk Onderzoek TNO, 's-Gravenhage (NL)

(*) Notice: Subject to any disclaimer, the term of this patent is extended or adjusted under 35 U.S.C. 154(b) by 0 days.

(21) Appl. No.: 15/947,530

(22) Filed: Apr. 6, 2018

(65) Prior Publication Data
US 2018/0227834 A1    Aug. 9, 2018

Related U.S. Application Data

(63) Continuation of application No. 14/355,764, filed as application No. PCT/EP2012/071961 on Nov. 7, 2012, now abandoned.

(30) Foreign Application Priority Data

Nov. 8, 2011 (EP) .................................. 11188289

(51) Int. Cl.
*H04W 48/10* (2009.01)
*H04W 48/08* (2009.01)
(Continued)

(52) U.S. Cl.
CPC ............ *H04W 48/10* (2013.01); *H04W 48/08* (2013.01); *H04W 36/0061* (2013.01); *H04W 48/14* (2013.01); *H04W 84/045* (2013.01)

(58) Field of Classification Search
CPC ..... H04W 8/183; H04W 48/18; H04W 36/30; H04W 36/18; H04W 36/12; H04W 36/04;
(Continued)

(56) References Cited

U.S. PATENT DOCUMENTS

| | | | |
|---|---|---|---|
| 5,390,339 A | | 2/1995 | Bruckert et al. |
| 8,805,374 B2* | | 8/2014 | Zhu ....................... H04W 36/36 455/436 |

(Continued)

FOREIGN PATENT DOCUMENTS

| | | |
|---|---|---|
| CN | 1863382 | 11/2006 |
| EP | 1 708 439 | 10/2006 |

(Continued)

OTHER PUBLICATIONS

"LTE; Evolved Universal Terrestrial Radio Access (E-UTRA); Physical Layer Procedures (3GPP TS 36.213, Version 10.2.0 Release 10)", Technical Specification, European Telecommunications Standards Institute (ETSI), vol. 3GPP RAN 1, No. V10.2.0, chapters 7.1, 8.2, Jun. 1, 2011.

(Continued)

*Primary Examiner* — Dai Phuong
(74) *Attorney, Agent, or Firm* — Hamilton, Brook, Smith & Reynolds, P.C.

(57) ABSTRACT

The invention relates to a wireless access telecommunications system comprising at least an SA-cell with which a terminal in an active mode is configured to have a data connection and an LA-cell on which the terminal in an idle mode is configured to camp. A method for the terminal to at least obtain LA-cell system information and SA-cell system (Continued)

information includes, when the terminal is in the active mode and an SA-cell radio interface of the terminal is enabled, the terminal receiving at least a part of the SA-cell system information for the terminal from the SA-cell via the SA-cell radio interface. The method further includes enabling an LA-cell radio interface of the terminal during one or more of a plurality of LA time periods and receiving at least a part of the LA-cell system information for the terminal from the LA-cell via the LA-cell radio interface.

14 Claims, 14 Drawing Sheets

(51) Int. Cl.
  *H04W 36/00* (2009.01)
  *H04W 48/14* (2009.01)
  *H04W 84/04* (2009.01)
(58) Field of Classification Search
  CPC ..... H04W 16/32; H04W 24/00; H04W 28/04; H04W 72/082; H04L 29/08657
  USPC .......... 455/432.1–444, 456.1–456.3
  See application file for complete search history.

(56) References Cited

U.S. PATENT DOCUMENTS

| | | | |
|---|---|---|---|
| 9,307,485 B2 | 4/2016 | Jorguseski et al. | |
| 9,769,720 B2 | 9/2017 | Malkamaki | |
| 9,936,445 B2 | 4/2018 | Jorguseski et al. | |
| 9,942,830 B2 | 4/2018 | Zhang et al. | |
| 9,955,363 B2 | 4/2018 | Mochizuki | |
| 10,470,110 B2 | 11/2019 | Jorguseski et al. | |
| 2003/0013452 A1 | 1/2003 | Hunt et al. | |
| 2004/0165563 A1 | 8/2004 | Hsu | |
| 2004/0218605 A1 | 11/2004 | Gustafsson | |
| 2005/0002373 A1 | 1/2005 | Watanabe et al. | |
| 2005/0153692 A1* | 7/2005 | Hwang ................ H04W 48/12 | 455/434 |
| 2006/0089964 A1 | 4/2006 | Pandey et al. | |
| 2007/0133492 A1 | 6/2007 | Baek et al. | |
| 2007/0297373 A1 | 12/2007 | Saifullah | |
| 2008/0165740 A1 | 7/2008 | Bachmann et al. | |
| 2008/0227488 A1 | 9/2008 | Zhu et al. | |
| 2008/0261570 A1 | 10/2008 | Barker et al. | |
| 2009/0061767 A1 | 3/2009 | Horiuchi et al. | |
| 2009/0197631 A1 | 8/2009 | Palanki et al. | |
| 2009/0239533 A1 | 9/2009 | Somasundaram et al. | |
| 2009/0286563 A1 | 11/2009 | Ji et al. | |
| 2010/0027510 A1 | 2/2010 | Balasubramanian et al. | |
| 2010/0027525 A1 | 2/2010 | Zhu | |
| 2010/0056160 A1* | 3/2010 | Kim ................ H04W 36/0055 | 455/444 |
| 2010/0075694 A1 | 3/2010 | Damnjanovic | |
| 2010/0111062 A1 | 5/2010 | Cho et al. | |
| 2010/0130212 A1 | 5/2010 | So et al. | |
| 2010/0195632 A1* | 8/2010 | Prabhu ................ H04W 4/029 | 370/338 |
| 2010/0240365 A1 | 9/2010 | Chen | |
| 2010/0260052 A1 | 10/2010 | Cho et al. | |
| 2010/0279689 A1 | 11/2010 | Tinnakornsrisuphap et al. | |
| 2010/0323663 A1 | 12/2010 | Vikberg et al. | |
| 2011/0053617 A1 | 3/2011 | Lee et al. | |
| 2011/0090831 A1 | 4/2011 | Johns | |
| 2011/0105116 A1 | 5/2011 | Kim | |
| 2011/0117889 A1 | 5/2011 | Burgess et al. | |
| 2011/0143755 A1 | 6/2011 | Khaledul et al. | |
| 2011/0151886 A1 | 6/2011 | Grayson et al. | |
| 2011/0223915 A1 | 9/2011 | Kwack et al. | |
| 2011/0225440 A1 | 9/2011 | Kwon | |
| 2011/0237239 A1* | 9/2011 | Chou ................ H04W 48/08 | 455/422.1 |
| 2011/0256883 A1* | 10/2011 | Park ................ H04W 60/04 | 455/456.1 |
| 2011/0294493 A1 | 12/2011 | Nagaraja et al. | |
| 2012/0003970 A1* | 1/2012 | Iwamura ............ H04W 56/00 | 455/422.1 |
| 2012/0009936 A1 | 1/2012 | Ishii et al. | |
| 2012/0028637 A1 | 2/2012 | Kashikar et al. | |
| 2012/0034913 A1 | 2/2012 | Wang et al. | |
| 2012/0058771 A1 | 3/2012 | Yu | |
| 2012/0077517 A1 | 3/2012 | Suzuki et al. | |
| 2012/0100884 A1 | 4/2012 | Radulescu et al. | |
| 2012/0201164 A1 | 8/2012 | Jongren et al. | |
| 2012/0225638 A1 | 9/2012 | Barnes | |
| 2012/0258757 A1 | 10/2012 | Qiu | |
| 2013/0023267 A1* | 1/2013 | Ong ................ H04W 52/0241 | 455/435.1 |
| 2013/0039195 A1 | 2/2013 | Weng et al. | |
| 2013/0039239 A1* | 2/2013 | Lin ................ H04W 52/0229 | 370/311 |
| 2013/0083744 A1* | 4/2013 | Peng ................ H04B 7/0615 | 370/329 |
| 2013/0095839 A1* | 4/2013 | Venkatraman ........ H04W 36/04 | 455/444 |
| 2013/0267234 A1 | 10/2013 | Choi et al. | |
| 2013/0343270 A1* | 12/2013 | Abe ................ H04W 36/0005 | 370/328 |
| 2014/0050129 A1 | 2/2014 | Magadi Rangaiah et al. | |
| 2014/0177492 A1 | 6/2014 | Sun et al. | |
| 2014/0179324 A1 | 6/2014 | Lee | |
| 2014/0293950 A1 | 10/2014 | Benjebbour | |
| 2014/0315549 A1 | 10/2014 | Zhang | |
| 2014/0335882 A1 | 11/2014 | Lee et al. | |
| 2014/0364116 A1 | 12/2014 | Jorguseski et al. | |
| 2015/0151886 A1 | 6/2015 | Kim | |
| 2015/0230236 A1 | 8/2015 | Zeng et al. | |
| 2016/0165522 A1 | 6/2016 | Zhang et al. | |
| 2016/0192279 A1 | 6/2016 | Jorguseski et al. | |
| 2017/0142585 A1* | 5/2017 | Heredia ............ H04W 12/0608 | |
| 2018/0192360 A1 | 7/2018 | Jorguseski et al. | |
| 2018/0213469 A1 | 7/2018 | Zhang et al. | |

FOREIGN PATENT DOCUMENTS

| | | |
|---|---|---|
| EP | 1 796 409 | 6/2007 |
| EP | 1 887 822 | 2/2008 |
| EP | 2 056 609 | 5/2009 |
| EP | 2 211 506 | 7/2010 |
| EP | 2 282 583 | 2/2011 |
| JP | 2001-160813 | 6/2001 |
| JP | 2005-269109 | 9/2005 |
| JP | 2007-74304 | 3/2007 |
| JP | 2007-266876 | 10/2007 |
| JP | 2010-166475 | 7/2010 |
| JP | 2011-091748 | 5/2011 |
| JP | 2011-101361 | 5/2011 |
| JP | 2011-176588 | 9/2011 |
| WO | WO 2004/091246 | 10/2004 |
| WO | WO 2006/106692 | 10/2006 |
| WO | WO 2008/023609 | 2/2008 |
| WO | WO 2009/022533 | 2/2009 |
| WO | WO 2009/022951 | 2/2009 |
| WO | WO 2009/082076 | 7/2009 |
| WO | WO 2010/078210 | 7/2010 |
| WO | WO 2010/078271 | 7/2010 |
| WO | WO 2010/084282 | 7/2010 |
| WO | WO 2010/117235 | 10/2010 |
| WO | WO 2013/037826 | 3/2013 |
| WO | WO 2013/037842 | 3/2013 |
| WO | WO 2013/037875 | 3/2013 |
| WO | WO 2013/068362 | 5/2013 |
| WO | WO 2013/068368 | 5/2013 |
| WO | WO 2013/068369 | 5/2013 |
| WO | WO 2015/004238 | 1/2015 |

OTHER PUBLICATIONS

"LTE; Evolved Universal Terrestrial Radio Access (E-UTRA); Potential Solutions for Energy Saving for E-UTRAN (3GPP TR 36.927 version 10.0.0 Release 10)", Technical Report, European

(56) References Cited

OTHER PUBLICATIONS

Telecommunications Standards Institute (ETSI), vol. 3GPP RAN 3, No. V10.0.0, chapters 5.1, 6.1, Jul. 1, 2011.
"LTE; Evolved Universal Terrestrial Radio Access (E-UTRA); User Equipment (UE) Procedures in Idle Mode (3GPP TS 36.304 version 10.2.0 Release 10)", Technical Specification, European Telecommunications Standards Institute (ETSI), vol. 3GPP RAN 2, No. V10.2.0, chapter 3.1, 4.15.2, 7, Jun. 1, 2011.
"Node B Measurements for LTE", Nokia Siemens Networks, 3GPP Draft; R1-073682 ENB Meas, 3rd Generation Partnership Project (3GPP), vol. RAN WG1, Athens, Greece; Chapters 2.2, 2.3, Aug. 16, 2007.
Ashraf, Imran, et al., "Improving Energy Efficiency of Femtocell Base Stations Via User Activity Detection", Wireless Communications and Networking Conference (WCNC), 2010 IEEE, pp. 1-5, Apr. 18, 2010.
Mahmud, K., et al., "Mobility Management by Basic Access Network in MIRAI Architecture for Heterogeneous Wireless Systems", Globecom '02, 2002—IEEE Global Telecommunications Conference, Nov. 17-21, 2002, vol. 2, Nov. 17, 2002.
Masakatsu, O, et al., "Power Saving Control Method for Battery-Powered Portable Wireless LAN Access Points in an Overlapping BSS Environment," IEICE Transactions on Communications, Communications Society, vol. E94B, No. 3, pp. 658-666, Mar. 1, 2011.
Notification of Transmittal of The International Search Report and The Written Opinion of The International Searching Authority for PCT/EP2012/071961, "Distribution of System Information in a Wireless Access Telecommunications System", dated Mar. 5, 2013.
Extended European Search Report for EP 11188289.0, "Distribution of System Information in a Wireless Access Telecommunications System", dated Jul. 5, 2012.
Final Office Action for U.S. Appl. No. 14/355,764, entitled "Distribution of System Information in a Wireless Access Telecommunications System" dated Oct. 3, 2016.
Final Office Action for U.S. Appl. No. 14/355,764, entitled "Distribution of System Information in a Wireless Access Telecommunications System" dated Nov. 6, 2017.
Non-Final Office Action for U.S. Appl. No. 14/355,764, entitled "Distribution of System Information in a Wireless Access Telecommunications System" dated Mar. 23, 2016.
Non-Final Office Action for U.S. Appl. No. 14/355,764, entitled "Distribution of System Information in a Wireless Access Telecommunications System" dated Mar. 10, 2017.

* cited by examiner

DISTRIBUTION OF SYSTEM INFORMATION IN A WIRELESS ACCESS TELECOMMUNICATIONS SYSTEM

RELATED APPLICATIONS

This application is a continuation of U.S. application Ser. No. 14/355,764, filed Nov. 7, 2012, which is the U.S. National Stage of International Application No. PCT/EP2012/071961, filed on Nov. 7, 2012, published in English, which claims priority under 35 U.S.C. § 119 or 365 to European Application No. 11188289.0, filed Nov. 8, 2011. The entire teachings of the above applications are incorporated herein by reference.

FIELD OF THE INVENTION

Generally, the invention relates to the field of wireless telecommunications. More specifically, the invention relates to the field of distributing system information from a cell to a terminal.

BACKGROUND

A cellular wireless access telecommunications network (system) typically includes multiple base stations, also known as, for example, base transceiver station in GSM, NodeB in WCDMA (UMTS), and evolved NodeB or eNB in LTE. A base station includes at least transmitting and receiving equipment to support wireless communication with a (possibly mobile) terminal, in standardization more formally known as UE (User Equipment). The range that can be covered with the transmitter/receiver in a base station is limited. The area that can be served by the transmitter/receiver of a base station is referred to as its "coverage area" or as the "cell." As used herein, the term "cell" refers to both the base station itself and to its associated coverage area. Commonly a cell relates to a particular sector (e.g. 120 degrees) radiating out from the base station position, where multiple sectors (cells) may cover the entire area around the base station position or may cover an particular area of interest (e.g. a narrow sector to cover a highway section).

A cell (base station) in a cellular network is typically connected to the remainder of the network via one or more backhaul links, for example, via optical fiber, via copper wire or wirelessly. A base station further includes processing capabilities, for example for the wireless transmission and reception and for handling the protocols specified between the base station and the terminal and between the base station and the network, including other base stations (cells).

In a cellular network, different cells may have different sizes, indicated e.g. as macrocells, microcells, picocells or femtocells in decreasing order of cell size. Cells may show a partial overlap with nearby cells or a smaller cell (e.g. picocell) may be entirely overlapped by a larger cell (e.g. macrocell). Multiple cells may thus form a cellular network providing near contiguous coverage in a very large area.

In a cellular wireless network it is common to distinguish a terminal to be in an 'idle mode' or in an 'active mode'. In the active mode, the terminal is able to exchange data (e.g. sending/receiving an e-mail or making a phone call) via a cell in which the terminal is located. This requires resources in the network (e.g. frequencies and/or codes and/or time slots) and also requires the terminal and the network to provide power for the purpose. In the idle mode the terminal is not able to exchange data and, therefore, does not require the above resources and consumes less power. A terminal in the idle mode only regularly listens to signals broadcast by the cells and selects a 'best cell', for example the cell with the signal that the terminal receives as strongest. A terminal in the idle mode also monitors the paging channel transmitted by the selected cell for a paging message addressing the terminal. Such an (idle mode) terminal is said to 'camp on' the selected cell. When, for example because of terminal mobility, a different cell is identified as best cell, the terminal may re-select the different cell as 'best cell' and camp on the newly selected cell. It should be noted that a terminal in the idle mode normally does not inform the cell and/or the network about which cell the terminal is camping on, also not when re-selecting a different cell as best cell. When the terminal re-selects to a cell which is found to be in a different location area (LA or RA—routing area), which the terminal may determine from the cell's system information, then the terminal initiates contact with the network via the newly selected cell to perform an LA or RA update procedure (which comprises an exchange of signalling or network control messages between the terminal and the cell), and subsequently resumes to its monitoring behavior as described above. Thus, the network is made aware of the LA/RA the idle terminal is located in. A LA/RA commonly comprises multiple cells, as configured by the network operator. Consequently, the network is not aware on which cell an idle mode terminal is camping on, it is only aware in which LA/RA an idle terminal is (expected to be) located.

In a cellular network for wireless telecommunication it is common that each cell, aka base transceiver station, NodeB, or eNB, when in operation, broadcasts so-called "system information" for reception by the terminals in the coverage area of the cell. This is schematically illustrated in FIG. 1 showing that a cell 1 is broadcasting system information 9 in the cell's coverage area (in FIG. 1 illustrated as a lightly shaded sector), which system information may be received by terminals 2 in the cell. FIG. 1 also illustrates that the cells 1 are connected to a network 3.

System information transmitted by a cell may relate to a wide variety of information associated with the cell and/or the network it operates in. Below are provided some examples of system information and possible uses of that information by the terminals. A person skilled in the art will recognize that system information may include one or more of these examples as well as other kinds of system information according to which a terminal receiving the information can configure itself.

In one example, the system information may include an indication of the network, such as e.g. Public Land-based Mobile Network (PLMN), the cell belongs to, enabling the terminal receiving this information to determine whether the terminal may possibly use that cell at all. In another example, the system information may include an indication of the cell's status, e.g. whether the cell is in operation and/or whether or not any restrictions, such as e.g. access class, apply. Such information enables the terminal to determine whether the terminal may use that cell at the moment. Further, the system information may include an indication of the identity of the cell (Cell ID), enabling the terminal to determine the cell's identity within that network. In yet other examples, the system information may include an indication of the cell's configuration, e.g. on which frequencies or frequency band or codes or time slots the cell operates and information about the configuration of the channels provided by the cell, enabling the terminal to configure the correct settings to receive the cell's various channels and/or an indication of the RACH (Random Access CHannel) parameters, such as e.g. frequency, channel, and code, enabling the terminal to initiate contact with that cell. Still further, the system information may include neighbor cell information, such as e.g. a neighbor cell list comprising identity and/or transmit frequency and/or codes and/or time slots for neighbor cells. If a network supports multiple Radio Access Technologies (RATs) such as e.g. GSM (GERAN—GPRS/EDGE Radio Access Network), UMTS (UTRAN—Universal Terrestrial Radio Access Network, using WCDMA—Wideband Code Division Multiple Access), or LTE (E-UTRAN—Evolved UTRAN, using OFDM—Orthogonal Frequency Division Multiplex), neighbor cell info may be provided separately, e.g. per RAT. This enables or facilitates the terminal to (quickly) find a neighbor cell e.g. for assessing the neighbor cell for the purpose of a potential cell re-selection or handover. Yet in another example, the system information may include indications about the criteria for e.g. cell re-selection and/or threshold for performing and/or reporting measurements on neighbor cells and/or on other frequencies and/or RATs, allowing the network to inform terminals about the criteria that should be applied in the network and/or in the cell.

It is common that a cell broadcasts the system information, e.g. on a broadcast channel, such that all terminals in the cell's coverage area are able to receive the cell's system information. Typically, the cell transmits the system information cyclically, in a sequential order, and in a substantially continuous way, e.g. cyclically repeating transmission of system information in a carousel-like structure, as is schematically illustrated in FIG. 2. As shown in FIG. 2, a cycle 4 includes system information organized in different categories shown as blocks M, S1, S2, S3, and S4. Block M is intended to illustrate an example of a Master Information Block (MIB) containing system information which is essential for most or all terminals in the network, while blocks S1-S4 are intended to illustrate additional System Information Blocks (SIB) with additional information that may be needed only for some terminals. The cycle 4 may then be continuously repeated as shown with a sequence 5 of transmitted system information. Sometimes, some blocks of system information may be replaced with other blocks, as shown with a sequence 6 illustrating that the last occurrence of blocks S3 and S4 shown in the sequence 6 is replaced with new blocks of system information S5 and S6. Nevertheless, as shown in FIG. 2, with both sequences 5 and 6, the system information is transmitted continuously.

There is a trade-off between using a large part of a cell's resources (e.g. a high bit rate and/or wide frequency bandwidth) and using a smaller part the cell's resources for broadcasting the system information. Using a large part of the resources allows realizing a short cycle time and enables a terminal to receive all of the system information with only a small latency, but demands significant resources of the cell. In contrast, using a smaller part of the resources results in a longer cycle time where a terminal has to accept a higher latency in receiving all or a particular piece of system information.

In current state-of-the-art technologies due consideration has been given to the realization of a flexible and efficient way to distribute system information. Nevertheless, in practice, broadcasting this information requires part of a cell's resources and also constitutes a part of cell's transmission power and energy consumption. Even though this may be only a modest fraction of a cell's peak power (e.g. less than 10%), it should be noted that this consumption is substantially continuous. In particular during periods with only a small traffic load the distribution of system information may constitute a percentual large overhead. Therefore, there appears to be room for improvement with respect to distributing system information in a more resource-efficient manner in conventional network architectures.

Recently, a new, more energy efficient, network architecture is being developed. One aspect in the new architecture is the use of relatively small cells. High bit rate data connections can be much more efficiently provided with a larger number of (at least partially overlapping) small cells (e.g. microcells, picocells, femtocells) than with a fewer number of larger cells (e.g. macrocells). A further aspect in the new architecture is that the power consumption of a cell is envisioned to scale, as much as possible, with the service actually provided (e.g. with the number of active terminals served, with the bit rate provided to a terminal, with the distance covered by the connection to a terminal, etc.). One approach for realizing this vision includes putting those cells that do not actually serve an active terminal into a power-save mode, e.g. switching those cells almost completely off. Another, complementary, approach includes significantly reducing or refraining from transmitting broadcast signals that are common in conventional networks. The transmission of these broadcast signals causes a substantial overhead, in particular for cells operating at less than full load.

The new architecture, schematically illustrated in FIG. 3, envisions distinguishing between different types of cells. A first type of cells, in this text referred to as 'SA-cell' and illustrated in FIG. 3 as a cell 7, is primarily optimized to support the wireless exchange of data with active terminals 2. The energy-efficiency improvements as outlined above are focused on the SA-cells. A second type of cells, in this text referred to as 'LA-cell' and illustrated in FIG. 3 as a cell 8, is primarily optimized for other functions in a cellular network, including those also found in conventional networks. Thus, it is envisioned to reduce the overhead in the system to that attributed to the LA-cells.

An LA-cell typically covers a larger area, for example comparable to that of a conventional macrocell. The LA-cells together provide near contiguous coverage in the area desired to be covered, much like in a conventional network. An LA-cell may broadcast system information, much like a conventional cell; an idle terminal may camp on an LA-cell and may also initiate a signalling connection with the LA-cell, e.g. to perform an LA/RA update or to detach from the network.

An SA-cell typically covers a smaller area, for example comparable to that of a conventional microcell, picocell or femtocell. The SA-cells together may support a certain bit rate in the near-contiguous area desired to be covered. An SA-cell only transmits signals when and in so far it is needed; it may be regarded to be normally 'off' or in a power-save or stand-by mode. An idle terminal also does not camp on an SA-cell. Although such a network has been referred to as a "Beyond Cellular Green Generation" (BCG2) network, this term may change in the future. Therefore, in the context of the present application, a network having such architecture will be referred to as an "energy-efficient cellular wireless network".

Since in an energy-efficient cellular wireless network a terminal may have to deal with two types of cells, one or more LA-cells and one or more SA-cells, the terminal may need relevant system information for one or more relevant LA-cells and for one or more relevant SA-cells. Two problems may then arise.

One problem arises from the fact that when an idle terminal becomes active, i.e. when an idle terminal is establishing a data session, a process referred to as a "session set-up," an appropriate SA-cell needs to be selected to support the session. In some of the session set-up solutions the terminal may need to acquire relevant system information for one or more candidate SA-cells, for example, cell ID, frame timing, cell bandwidth, etc. Also, when an appropriate SA-cell for the session has been selected, a terminal may need additional system information for that SA-cell. If the selected SA-cell is currently switched off or in an energy-conserving mode, which is part of the BCG2 concept, the SA-cell needs to be activated. Selection and activation of an appropriate SA-cell may require some time. As a result, it may also take some time before that SA-cell is sufficiently activated to provide the necessary system information to the terminal. Further, since the concept of an energy-efficient cellular wireless network envisages a highly dynamic configuration of SA-cells, using previously acquired and stored SA-cell system information for a particular SA-cell (e.g. the SA-cell system information acquired and stored at the occasion of a previous session set-up) bears a high risk that the previously acquired SA-cell system information is no longer valid. Consequently, there is a need to provide a terminal with relevant and up-to-date SA-cell system information to enable a quick establishment of a data session with an appropriate SA-cell.

Another problem arises from the fact that when an active terminal resumes to idle mode after finishing all data sessions, the terminal needs to re-camp on an LA-cell. For this purpose the terminal performs a cell search and/or cell re-selection procedure during which the terminal may need to acquire relevant system information for one or more candidate LA-cells, such as e.g. cell ID, frame timing, cell bandwidth, paging channel, etc. Though in the context of the energy-efficient cellular wireless network the LA-cell configuration might be less dynamic then the SA-cell configuration, using previously acquired LA-cell system information (e.g. the LA-cell system information acquired before establishing a data session) also bears a risk that the previously acquired and stored LA-cell system information is no longer valid. This could be the case e.g. because the LA-cell system information was modified in the meantime or the LA-cell system information is no longer relevant e.g. because the terminal moved into the coverage area of a different LA-cell for which no information has been previously acquired and stored. To acquire relevant and up-to-date LA-cell system information, the terminal could again perform the cell search procedure, similar to the cell search procedure at power-on. Thus, it may take some time before the terminal has found an appropriate LA-cell to camp on and before the terminal is able to again monitor the paging channel of that LA-cell. As a result, there is also a need to provide a terminal with relevant and up-to-date LA-cell system information to enable the terminal to quickly re-camp onto an appropriate LA-cell (which may be the same or a different LA-cell as the one on which the terminal was camping before the data session was established), when a terminal resumes idle mode after having been in active mode.

As the foregoing illustrates, what is needed in the art are methods and systems for distributing system information in conventional networks in a more energy-efficient manner. In addition, what is needed in the art are methods and systems for distributing LA-cell system information and SA-cell system information in energy-efficient cellular wireless networks, such as e.g. BCG2 networks, in a manner that can solve the problems described above and is, preferably, radio resource efficient, energy efficient, and imposing limited requirements on hardware and computational resources in a terminal.

SUMMARY

According to one aspect of the present invention, in a wireless access telecommunications network system comprising at least an SA-cell with which a terminal in an active mode is configured to have a data connection and an LA-cell on which the terminal in an idle mode is configured to camp, a method for the terminal to at least obtain LA-cell system information and SA-cell system information is disclosed. The method includes, when the terminal is in the active mode and an SA-cell radio interface of the terminal is enabled, the terminal receiving at least a part of the SA-cell system information for the terminal from the SA-cell via the SA-cell radio interface. The method further includes steps of enabling an LA-cell radio interface of the terminal during one or more of a plurality of so-called LA time periods set by the LA-cell, and receiving at least a part of the LA-cell system information for the terminal from the LA-cell via the LA-cell radio interface.

Embodiments of this solution are based on the idea that the LA-cell that the terminal in the idle mode is camping on may be configured to transmit its LA-cell system information while the SA-cell with which the terminal in the active mode has a data connection may be configured to transmits its SA-cell system information. The terminal may also receive, via the enabled LA-cell radio interface, LA-cell system information regarding other LA-cells in the network, either directly from the other LA-cells or via the LA-cell that the terminal in the idle mode is configured to camp on. Similarly, the terminal may also receive, via the enabled SA-cell radio interface, SA-cell system information regarding other SA-cells in the network, either directly from the other SA-cells or via the SA-cell that the terminal in the active mode is configured to have a connection with.

In an embodiment, the method may further include the terminal configuring one or more of its settings based, at least partially, on the received SA-cell system information and/or the received LA-cell system information. Additionally or alternatively, the terminal may store at least part of the received SA-cell system information and/or LA-cell system information for future use. In a further embodiment, an idle terminal, as long as it remains in idle mode, is likely to apply only the received and, possibly, stored LA-cell system information to configure its settings, whereas the received SA-cell system information is likely to be just stored for possible later use. Only when the terminal is about to enter into active mode, the terminal is likely to also apply the received and, possibly, stored SA-cell system information to further configure its settings for the particular SA-cell with which the terminal is connected.

As used herein, expressions "information transmitted by a cell for a terminal," "information for a terminal" and variations thereof describe system information which is intended for the terminal, e.g. for a possible benefit of the terminal. For example, some system information may be intended primarily for a terminal in idle mode, some other system information may be intended primarily for a terminal in active mode and some system information may be intended for a terminal regardless its mode. In this respect, it is not relevant whether or not system information transmitted by a cell is actually received and/or is actually used by the terminal. For example, when a cell transmits system information via a broadcast channel, it enables all terminals in the cell's coverage area to receive that system information. Yet, in reality, not all but only some of these terminals may have in interest in the transmitted system information and others may not. Also, not all but only some of terminals with a possibly interest in the transmitted system information may actually receive it, others may miss it (e.g. because of a transmission error, because the terminal is performing other tasks, etc.) and yet others may simply, possibly intentionally, ignore the transmission, e.g. because the transmitted system information has already been obtained earlier.

In the context of the embodiments of the present invention, the expressions "LA-cell" and "SA-cell" are used to differentiate between two different types of cells.

The first type of cell, the LA-cell (Large Area cell), refers to a cell that is able to cover a larger area with a smaller bit rate, as compared with the second type of cell. The LA-cell is primarily intended for carrying signaling messages from/to a terminal, e.g. the LA-cell is intended to at least be able to page a terminal. A terminal in idle mode may further be assumed to 'camp' on at least one of these LA-cells. While the LA-cell is not primarily intended to be used to carry wireless user data from/to a terminal, it is not precluded that other signaling than paging or that also some user data is carried via an LA-cell. In the intended coverage area of the wireless access network it may be assumed that at least one LA-cell is fully operational or, in other words, an LA-cell is 'normally on.'

The second type of cell, the SA-cell (Small Area cell), refers to a cell that is able to cover a smaller area with a higher bit rate, as compared with the LA-cell. The SA-cell is primarily intended to carry user data from/to a terminal over the established data connection (i.e., the SA-cell is primarily intended to handle connections with active terminals). Yet, it is not precluded that also some other information and/or some signalling is carried via an SA-cell. In the intended coverage area of the wireless access network it may be assumed that at least one SA-cell is able to provide coverage. An SA-cell is only fully operational when and to the extent that it is needed or, in other words, an SA-cell is 'normally off.'

According to various embodiments of the present invention, the SA-cells may occur in any mix of frequency bands and/or radio access technologies (RATs). It is also not precluded that there are differently sized SA-cells (e.g. macro, micro, pico and femto SA-cells, with or without a hierarchical organization), where larger SA-cells may e.g. more efficiently serve highly mobile terminals.

As used herein, the expression "data connection between a terminal and an SA-cell" refers to a communication path for a wireless exchange of user data between the terminal and the SA-cell. The communication path for user data, including the section between the terminal and the SA-cell, is usually set up according to a set of parameters, for example, depending on what type of user data needs to be exchanged (e.g. for sending/receiving e-mail, for making a voice or video call, etc.). The set of parameters, commonly referred to in the art as "QoS parameters" or "QoS profile," may include parameters such as e.g. maximum bitrate, guaranteed (minimum) bitrate, bit error ratio and delay/latency.

In contrast, signalling messages exchanged between the terminal and the LA-cell do not contain user data and are exchanged between e.g. the terminal and various entities in the telecommunication system. Signalling messages may be exchanged without establishing a connection or via a "signalling connection" with a modest bit rate and with a quality sufficient for most signalling information to arrive uncorrupted. A signalling connection, when used, is to a large extent also independent of the parameters of the "data connection" it may be associated with.

Further, it is understood that the terms "user data" and "user terminal" do not necessarily imply a presence of a human user and the embodiments of the present invention may also be applicable to e.g. a smartphone checking e-mail without human intervention and to machine-to-machine (M2M) communications and/or Machine-Type Communications (MTC). The term "user data" is merely used to differentiate between the actual data that is to be exchanged over the data connection and the signaling.

As described herein, a terminal may be either in an "active mode" or an "idle mode." As used herein, the expression "a terminal in an idle mode" refers to a terminal that is neither exchanging user data nor able to exchange user data but is camping on a LA-cell and is monitoring possible paging messages for the terminal from the LA-cell. In other words, the expression "a terminal in an idle mode" is used to describe a terminal which does not have support for the wireless exchange of user data between the terminal and an SA-cell. In contrast, the expression "a terminal in an active mode" refers to a terminal that is either exchanging user data or able to exchange user data via at least one SA-cell. In other words, an active terminal supports or is able to support the wireless exchange of user data between the terminal and the SA-cell(s). These notions of idle mode and active mode may be comparable with like notions in standardized conventional networks but do not necessarily coincide exactly with standardized definitions.

In an embodiment, the method further includes, when the terminal is in the active mode, providing an indication to the SA-cell when to pause transmission of user data from the SA-cell to the terminal. Such an indication may also notify the SA-cell when to end the pause on the transmission of user data from the SA-cell to the terminal. This embodiment is particularly useful for the "more flexible" and "most flexible" configurations of solution #2 described herein.

In an embodiment, the method further includes disabling the SA-cell radio interface when the LA-cell radio interface is enabled and disabling the LA-cell radio interface when the SA-cell radio interface is enabled.

According to another aspect of the present invention, an LA-cell for use in the methods described herein is disclosed. The LA-cell is configured at least for transmitting at least the part of the LA-cell system information for the terminal during at least a part of the plurality of the LA time periods, where each time period of the plurality of the LA time periods is adjacent to a time period during which no part of the LA-cell system information for the terminal is transmitted.

In an embodiment, the LA-cell may also be configured for setting the plurality of LA time periods for transmitting at least the part of the LA-cell system information for the terminal, where, as used herein, the term "setting" is intended to cover all possible manners of identifying when the periods take place. For example, "setting" the periods may include establishing beginning and end times of these periods, establishing the beginning times and durations of these periods, etc. In other embodiments, the LA time periods may be set by some other network entity such as e.g. an entity controlling the LA-cell, another cell, and a network management or OAM (Operation, Administration and Maintenance) entity. The indication of when the set LA time periods take place may be provided to the terminal.

In an embodiment, the plurality of the LA time periods may be set in a first predetermined pattern, e.g. periodically.

In an embodiment, at least one of the plurality of the LA time periods may be synchronized with the SA-cell transmitting the SA-cell system information.

According to other aspects of the present invention, two different variations of possible SA-cells for use in the methods described herein are disclosed.

The first SA-cell is configured at least for transmitting at least the part of the SA-cell system information for the terminal during a plurality of SA time periods, where each time period of the plurality of the SA time periods is adjacent to a time period during which no part of the SA-cell system information for the terminal is transmitted. In an embodiment, the first SA-cell may further be configured for pausing the transmission of user data from the SA-cell to the terminal when the at least the part of the SA-cell system information for the terminal is transmitted. In other words, the SA-cell may be configured to pause transmission of user data to the terminal during the SA time periods. In an embodiment, the plurality of the SA time periods may be set in a second predetermined pattern, e.g. periodically. In an embodiment, at least one of the plurality of the SA time periods is synchronized with the LA-cell transmitting the LA-cell system information. The embodiments of the first SA-cell are most applicable to the "very simple" configuration of solution #2 described herein.

The second, alternative, variation of SA-cell is configured at least for receiving an indication from the terminal when to pause transmission of user data from the SA-cell to the terminal; and pausing the transmission of the user data from the SA-cell to the terminal in response to receipt of the indication. In an embodiment, at least a portion of the at least the part of the SA-cell system information for the terminal may be transmitted by the SA-cell outside of the plurality of the LA time periods. In an embodiment, the plurality of the LA time periods may be set in a periodic pattern having a first period and the plurality of the SA time periods may be set in a periodic pattern having a second period, where the second period is different from the first period by a predetermined time and where, optionally, the predetermined time is at least the duration of one of the plurality of the LA time periods. Alternatively, the SA-cell may be configured to transmit SA-cell system information with a repetition period that is a predetermined time shorter or longer than the repetition period of transmission of the LA-cell system information, where the predetermined difference in the repetition periods is preferably at least the duration of an LA time period, but also not too large, e.g. substantially smaller than the duration of an SA time period. The embodiments of the second SA-cell are most applicable to the "more flexible" and "most flexible" configurations of solution #2 described herein.

According to other aspects of the present invention, a terminal, a computer program with portions (possibly distributed) for performing the various functions described herein, a data carrier for such software portions, and a telecommunications system are disclosed. The telecommunications system may include two or more of the terminal, the LA-cell, and the SA-cell as described herein.

Hereinafter, embodiments of the invention will be described in further detail. It should be appreciated, however, that these embodiments may not be construed as limiting the scope of protection for the present invention.

DETAILED DESCRIPTION OF THE DRAWINGS

Solutions #1-4 below provide various methods and systems for distributing system information. Solution #1 is described with references to a conventional network, such as the one shown in FIG. 1, while solutions #2-4 are described as being specifically adapted for distributing system information in energy efficient networks. However, a person skilled in the art will realize that the teachings regarding distribution of system information by a cell in a conventional network, as provided in solution #1, are applicable for distribution of system information by SA-cells and LA-cells in energy efficient networks.

Solution #1: Distribution of System Information According to Various Embodiments of the Present Invention Solution #1 is intended to primarily focus on the possibilities to improve the efficiency (including energy-efficiency) of distributing system information by a cell. As described above, solution #1 is described with a reference to a conventional network such as the one illustrated in FIG. 1, but the embodiments of solution #1 can be applied to any cell distributing system information, not only to conventional cells such as base transceiver stations, NodeBs or eNBs, but also to SA-cells and/or LA-cells in energy efficient networks.

Solution #1 provides five different ways to improve energy efficiency of distributing system information by a cell. A first way is based on broadcasting system information for only a fraction of the time and not transmitting any system information (or transmitting significantly less system information) for the remaining fraction of the time, rather than the usual substantially continuous transmission as is done in prior art. A second way is based on broadcasting system information when triggered to do so by a particular event. A third way is based on, rather than broadcasting with the usual full power to reliably reach the furthest, in terms of path loss, edge of a cell's coverage area, transmitting system information with a substantially reduced power. A fourth way is based on, rather than using the usual cyclic transmission system information parts, transmitting only a reduced fraction of system information. A fifth way is based on, rather than using the usual broadcast channel and transmitting system information to all terminals that possibly might be present in the cell's coverage area, transmitting system information to only a particular terminal via a dedicated channel. These five different ways are now described in greater detail.

1. Intermittent System Information Transmission (for only a Fraction of the Time)

Figure 1:
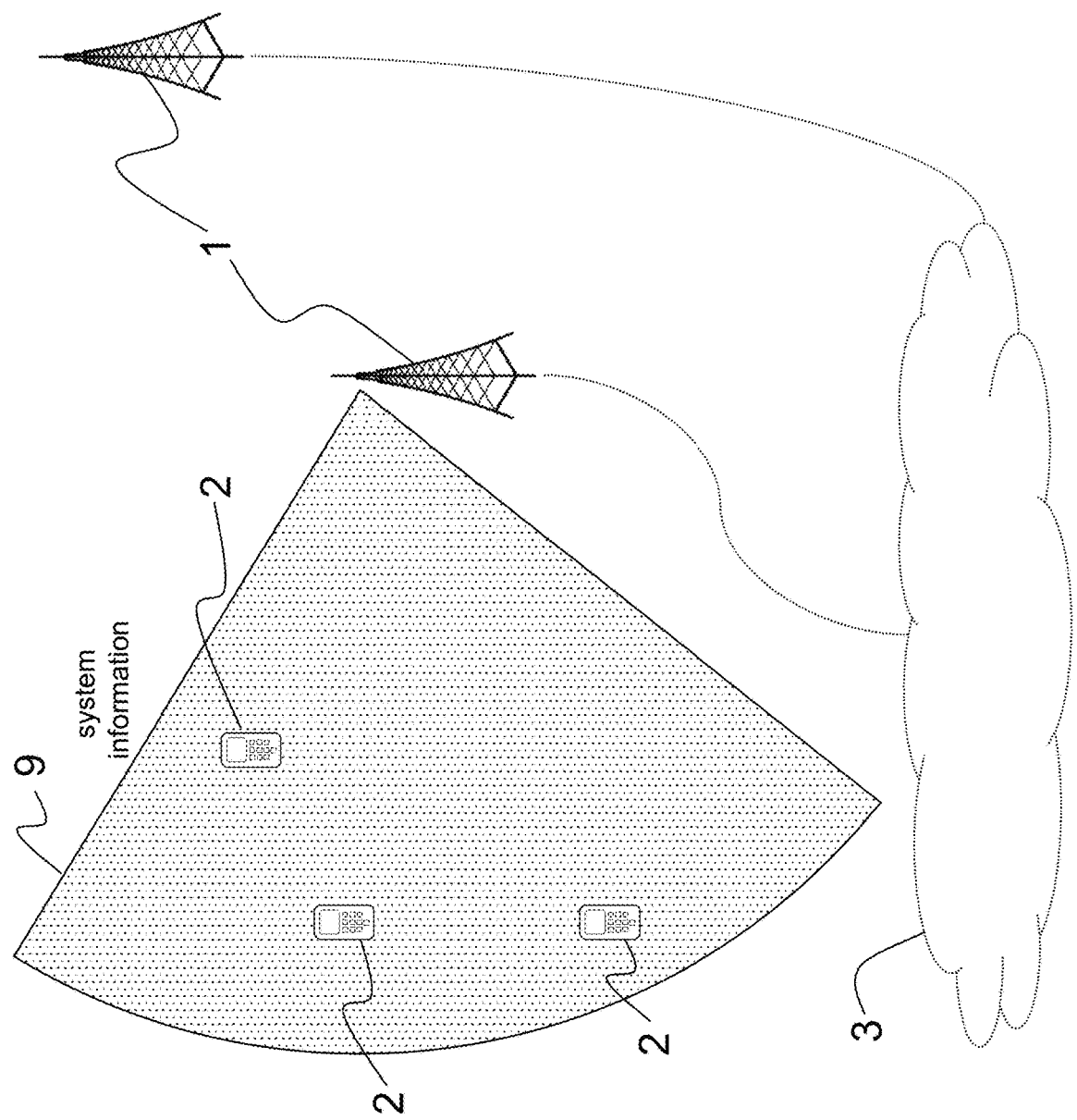
FIG. 1 is a schematic illustration of system information distribution in a conventional network.
Figure 2:
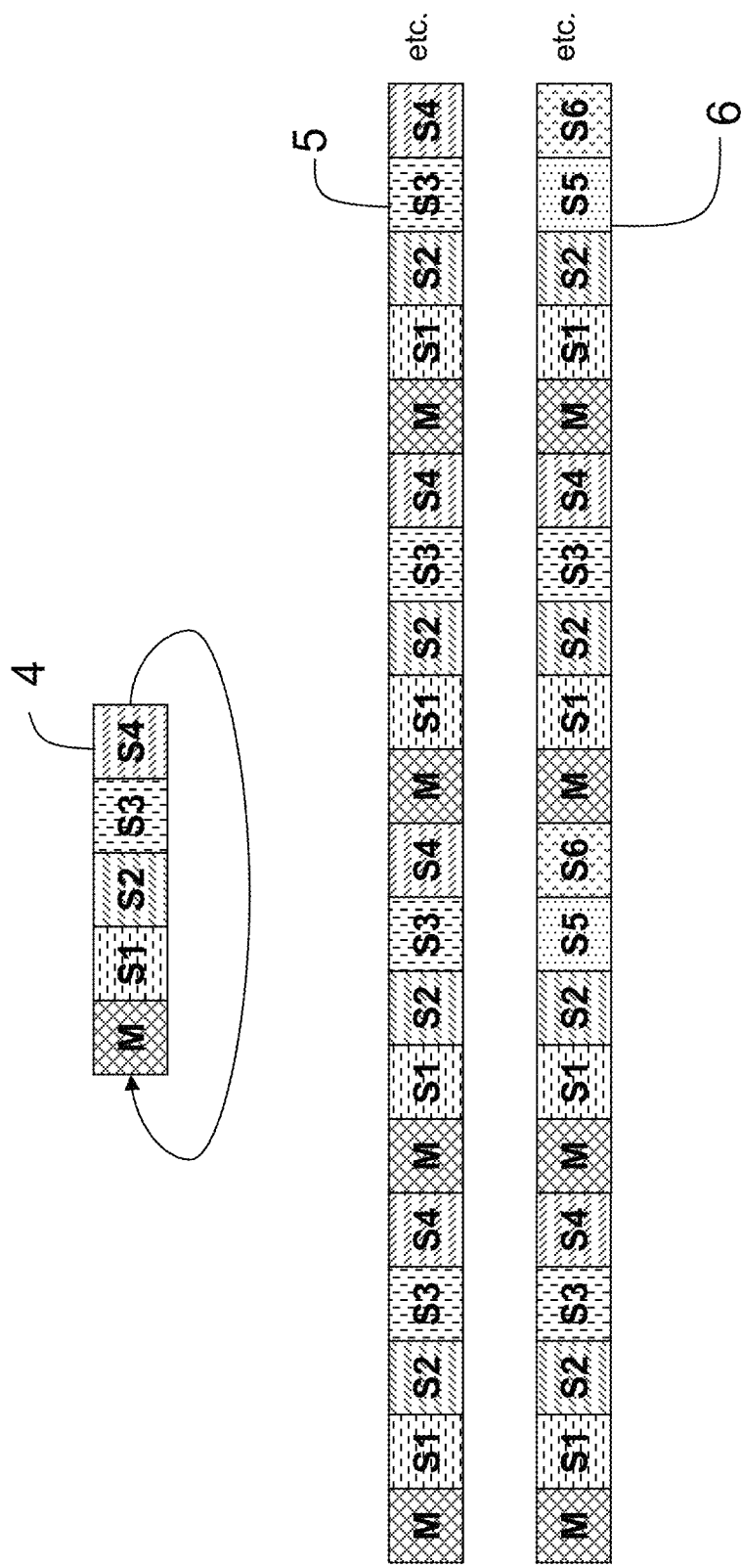
FIG. 2 is a schematic illustration of continuous transmission of system information according to prior art.
Figure 3:
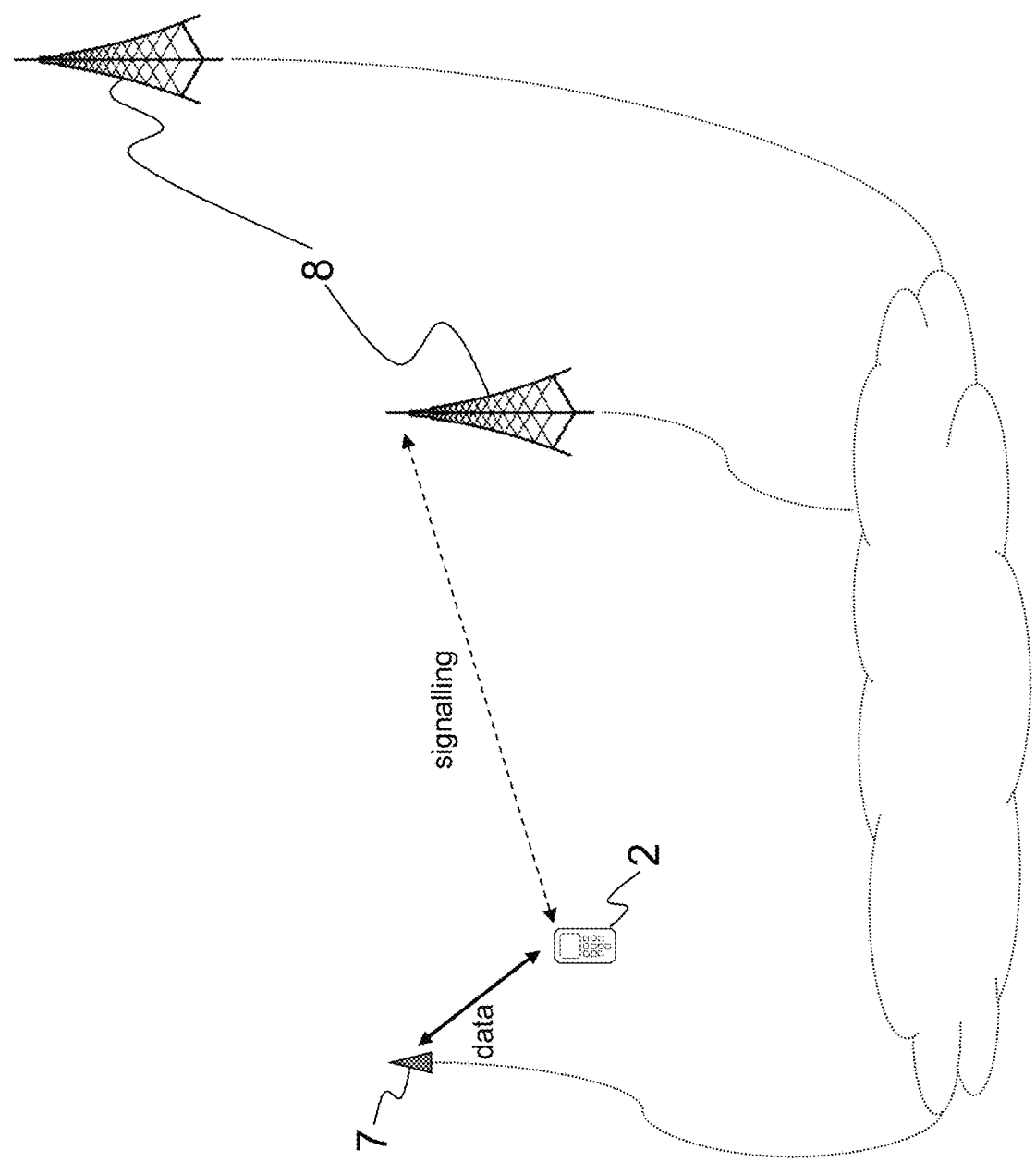
FIG. 3 is a schematic illustration of SA- and LA-cells in an energy-efficient cellular wireless access telecommunications network.

A first way to achieve a more energy efficient distribution of system information is for a cell, such as e.g. the cell 1 illustrated in FIG. 1, to only transmit system information intermittently, i.e. for a fraction of the time. For example, a cell may be configured to transmit a system information signal for 100 milliseconds (ms), followed by 900 ms of not transmitting any system information, corresponding to a fraction $\frac{1}{10}^{th}$. To that end, the cell may include at least a transmitter and a controller for preparing a signal for transmission. The cell may further include a memory for storing computer program instructions according to which the controller and/or the transmitter may be configured to operate as well as a processing unit for processing data and running the computer programs on.

Figure 4:
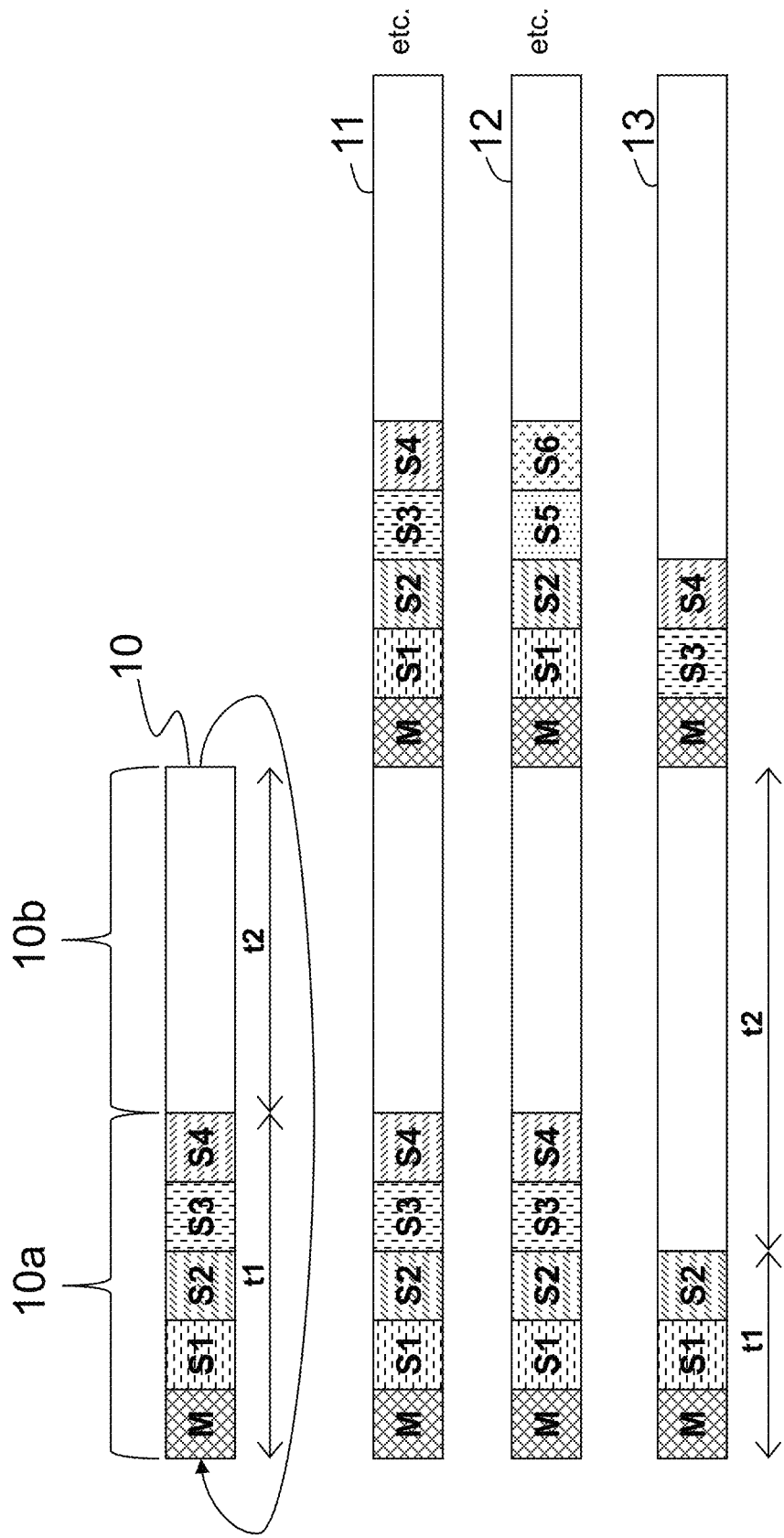
FIG. 4 is a schematic illustration of intermittent periodic transmission of system information, according to an embodiment of the present invention.

The duration of transmitting a system information signal may correspond to a full cycle of a cell's system information or to a particular system information part. This is schematically illustrated in FIG. 4 with a signal 10, where the full cycle of the cell's system information 10*a* comprising blocks M, S1, S2, S3, and S4 is transmitted during a time period of duration t1 adjacent to a time period of duration t2 where no system information 10*b* is transmitted. A cell can then repeatedly transmit the signal 10, thus repeatedly transmitting system information blocks M and S1-S4 corresponding to 10*a* during the time period t1 adjacent to transmitting no system information corresponding to 10*b* during the time period t2, as shown with a signal 11. Alternatively, some of the system information portions may be replaced by other portions, as shown with a signal 12 where, in some case, system information blocks S5 and S6 are present instead of the blocks S3 and S4.

The duration of transmitting a system information signal may also be shorter, e.g. correspond to only a fraction of a system information (or system information part) cycle. Then, a full cycle of system information or system information part transmission may be distributed over multiple periods of transmitting and not transmitting the system information signal, as shown in FIG. 4 with a signal 13, thus increasing the time a terminal may need to acquire the entire system information (or system information part) compared to a case with substantially continuous transmission of system information.

The duration of transmitting a system information signal may also be longer than a full cycle of system information or system information part. For example, this could be the case for a duration that corresponds to a multiple of cycles of system information or system information part. In another example, this could be the case for a duration that corresponds to a single full cycle of a cell's system information or system information part plus an extension to allow e.g. repeating transmitting information that the cell considers to be more important or estimates to be more urgent than other information in the system information or system information part and, therefore, wishes to transmit more reliably. In case a terminal failed to receive a system information element or the terminal detected or suspects that it received a system information element erroneously, transmitting system information in this manner enables the terminal an additional opportunity to acquire or to double-check the repeated system information element, within the same period of system information transmission.

Varying the duty cycle (i.e. the ratio between the "on" and "on"+"off" times for transmitting the system information or system information part signal) in this manner allows reducing the power of the emitted presence signal to roughly the same fraction, as opposed to a conventional approach where a system information transmission would be substantially 100% of the time. In one embodiment, the maximum duty cycle for an intermittent system information or system information part signal emitted by a cell could be e.g. ½ or $\frac{1}{8}^{th}$, which could result in an 2-fold or 8-fold, respectively, power saving in comparison with the same signal emitted continuously. Different duty cycles may be applied to the transmission of different system information parts, e.g. according to the (estimated or expected) urgency with which a terminal may need the information.

The following example may illustrate this. In current systems, when a terminal is powered on, the terminal initiates a cell search procedure to find a suitable cell to camp on. As a part of such a procedure, the terminal needs to identify one or more candidate cells and then, for a particular candidate cell, may need to determine, for example, the network (Public Land Mobile Network) the cell relates to, an indication of the cell identity and/or the operational status of the cell (e.g. whether or not it is currently barred for the terminal's access class and/or possibly overloaded). A substantially continuous or very frequent broadcast of system information, as is common practice in prior art systems, may very well suit such a terminal's needs. However, such broadcast is not energy efficient if there is, in a particular period of time, no terminal being powered on and/or no terminal performing a cell search procedure on that particular cell. According to an embodiment of the present invention, energy efficiency is improved by transmitting the system information part intended for terminals performing a cell search procedure only for a fraction of the time, e.g. once every second. A terminal, attempting to receive the particular system information part may have to wait for some time before being able to actually receive it. In this example, in worst case, the waiting time would be a second, but, on average, the waiting time would be half a second. Because of the considerations of the waiting time, preferably there is an upper bound to the period of time between successive transmissions of the system information part such that this transmission upper bound does not exceed an upper bound to the waiting time or latency a terminal may be expected to tolerate. A transmission upper bound may be selected differently for different system information parts, e.g. when terminals tolerate more latency for a particular system information part than for another system information part. For example, the transmission upper bound for the system information part that comprises the cell's handover parameters may be selected considerably higher than the one for the system information part that comprises the cell's RACH (Random Access CHannel) parameters, e.g. with the motivation that a terminal initiating contact with the selected cell via its RACH requires the RACH parameters before being able to do so, while a terminal which made a handover to a new cell is unlikely to immediately need information regarding that cell's handover parameters.

In an embodiment, the period of time between successive transmissions of a system information part or the upper bound to that period may be modified over time. For example, during peak hours, such as e.g. in the morning when people tend to switch on their cell phone, a low value, such as e.g. 0.25 seconds (s), may be selected for the transmission upper bound of a system information part typically used by terminals that perform a power-on procedure. Later in the day, when most terminals can be expected to be already powered-on, a higher value, such as e.g. 1 second, may be selected. During the night, still a higher value, such as e.g. 5 seconds, may be selected. At this time, even a value so high that it is beyond what a terminal would normally tolerate, could be regarded as acceptable in view of the energy saving achieved.

In particular when intermittent transmission of a system information part is performed periodically, e.g. every 1 s, it is preferred that nearby cells synchronize their transmission of a particular system information part such that the transmissions do not overlap. For example, assuming the transmission of the system information part takes considerably less than 100 ms, cell A may transmit its system information at times 1.0, 2.0, 3.0, . . . , etc. second, nearby cell B—at times 1.1, 2.1, 3.1, . . . , etc. second, and nearby cell C—at times 1.4, 2.4, 3.4, . . . , etc. second. Doing so enables a terminal to perform a cell search procedure quasi-simultaneously on multiple candidate cells (such as cells A, B and C), without experiencing for each candidate cell separately the average or even the maximum latency. For example, with the above figures, the system information part of up to 10 cells could be received in a time frame of about 1 second whereas without such 'staggered' transmission times of that system information part, it could take up to 10 seconds in the worst case scenario (i.e., 10 times the worst case delay of 1 second), or, on average, 5 seconds (i.e., 10 times the average delay of 0.5 second). In particular, cells within a same PLMN or in a set of co-operating PLMNs can be expected to benefit from the approach.

2. Transmit System Information Triggered by Some Event, Multiple Events, and/or Combination of Events In a case of a terminal powering up and requiring system information of a particular cell, the network and in particular the cell, is typically not aware of the terminal's need. In other cases, the network and/or the cell may be aware and/or may foresee or expect a terminal's need and/or may be made aware of a terminal's need for a particular system information part. Therefore, in various embodiments, a trigger for transmission of a system information part may comprise an implicit or an explicit trigger.

Implicit Trigger to Transmit a System Information Part

For example, when a terminal establishes a data session via a cell (usually the cell the terminal was camping on), the network, and in particular the cell involved in the data session, may expect that the terminal may need additional system information parts. For example, the terminal may need parameters specifying the criteria for making measurements on other cells and criteria for reporting (e.g. so-called 'events' in the context of handover, an event being e.g. the signal level of the serving cell drops below a predetermined threshold and/or the signal level of a neighbor cell exceeds the signal level of the serving cell by some predetermined margin, the margin being either positive or negative). In that case, the cell may transmit this system information part e.g. shortly after a session set-up via the cell. Doing so will result in a considerable energy saving compared to the usual case of substantially always repeating transmission of this system information part.

In a further embodiment, the cell may apply a delay, e.g. 10 seconds, between the moment a first trigger has been received (e.g. a session set-up via the cell has been completed) and the transmission of the related system information part (i.e. the system information part possibly needed by the terminal). Other terminals, having established a session via the same cell (each of which may be interpreted as a trigger) within the delay period, may also receive the same system information part, thus relieving the cell from transmitting the same information multiple times.

Preferably, the delay value should not exceed a predetermined value corresponding to e.g. a maximum latency generally considered as acceptable to a terminal, such as e.g. 15 seconds. Thus, when multiple terminals establish a session set-up within the delay period, a single transmission of the system information part suffices to inform these terminals.

A person skilled in the art will recognize that applying a delayed transmission is beneficial only when other triggers related to some system information part (e.g. one or more additional session set-ups) can be expected within the delay time, such as e.g. during peak hours. When, however, the rate of triggers (e.g. session set-ups) is low, e.g. less than one session set-up per delay period, the delay is preferably set to a smaller value or to zero.

The delayed transmission of a triggered system information part may be combined with the option of a reduced power transmission described in greater detail below. Then, the reduced power setting should be in correspondence with the most distant, in terms of path loss, terminal in the group of terminals that completed a session set-up within the particular delay time period.

Another example is that the cell is configured for multiple RACH channels, one generic RACH channel (i.e. a predetermined RACH channel configured for all cells in a network or at least for multiple cells in an area) and one or more RACH channels configured per-cell. Then, a terminal not (yet) having received the RACH channel configuration for a particular cell, may direct its first request via the generic RACH channel of that cell. That request may be handled by the cell or may be discarded, depending on system configuration and depending on the load of the cell. A cell, having received a RACH request on its generic RACH channel may consider such an event as a trigger to transmit the system information part related to its RACH channel configuration, such that subsequent requests from the terminal that transmitted the request may be directed to any of the per-cell configured RACH channels. This applies not only to the particular terminal that transmitted the request; other terminals in the cell that did not (yet) issue such a request, may also receive the cell's RACH configuration system information part transmitted as a result of this particular terminal's RACH request.

It may be noted that in this case there may be no significant benefit from applying a delay as described above, and there may also be no significant benefit from applying the reduced power option. An undelayed transmission of the RACH configuration with substantially full power may then, with a single transmission, serve multiple terminals monitoring that cell's system information channel. Applying the reduced power option may depend on a cell's estimated or expected number of terminals in its coverage area, e.g. apply the reduced power option in off-peak hours and not apply the reduced power option in peak hours.

Explicit Trigger to Transmit a System Information Part

According to one embodiment of the invention, a terminal which finds itself in need for some particular system information part may issue a system information part request towards the cell. Such a request is not found in conventional networks and may be a request specially designed for the purpose. Such a request may be implemented e.g. similar to a RACH request. In a further embodiment, the system information part request would advantageously allow the terminal to specify which system information part or, possibly, multiple system information parts the terminal requests. In response to receiving such an explicit request, the cell may be configured to transmit the requested system information part, which is then received by the requesting terminal and possibly also by other, additional terminals monitoring that cell's system information channel.

In an embodiment, a cell may interpret an explicit request also as an implicit additional request and transmit additional system information parts that were not specified in the explicit request. This could be the case for example if the cell expects, e.g. based on experience, that such additional system information parts are typically also and/or subsequently requested. Such an embodiment could be particularly advantageous if an explicit system information part request does not allow multiple system information parts to be requested.

It may be noted that in this case there may be no significant benefit from applying a delay as described above, and there may also be no significant benefit from applying the reduced power option. An undelayed transmission of the requested system information part or parts with substantially full power may then, with a single transmission, serve multiple terminals monitoring that cell's system information channel. Applying the reduced power option may depend on a cell's estimated or expected number of terminals in its coverage area, e.g. the cell could be configured to apply the reduced power option in off-peak hours and not apply the reduced power option in peak hours.

Figure 5:
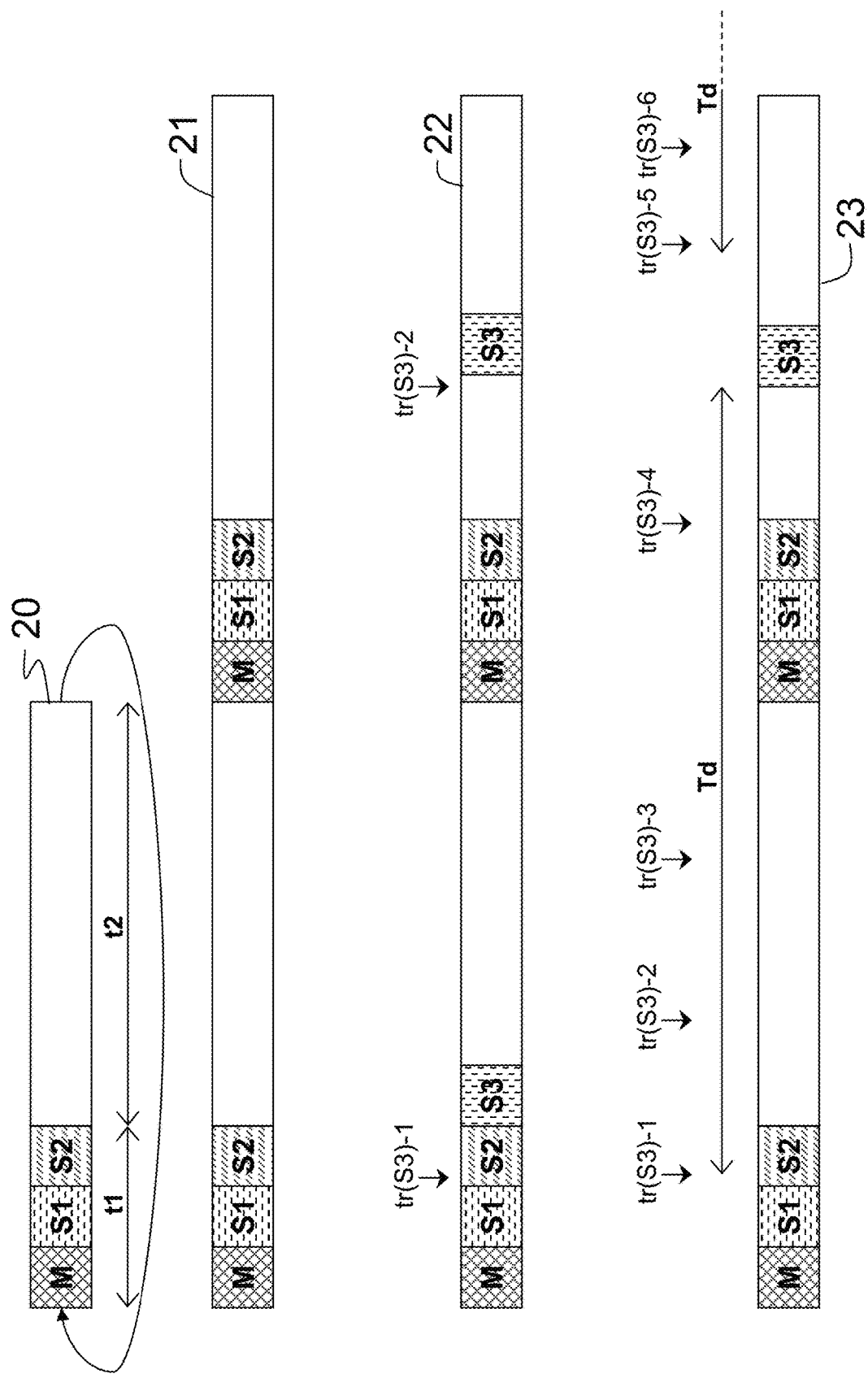
FIG. 5 is a schematic illustration of triggered transmission of system information, according to various embodiments of the present invention.

FIG. 5 provides an exemplary illustration of the concept of transmitting system information in response to a trigger, either implicit or explicit. A cell may be configured to repeatedly transmit a signal, e.g. a signal 20 shown in FIG. 5, comprising system information blocks M, S1, and S2, similar to these blocks illustrated in FIG. 4, followed by a time period t2 where no system information is transmitted. The repeated transmission of a signal 20 is shown in FIG. 5 with a signal 21. In addition, the cell may receive a trigger, as either an implicit or explicit trigger described above to transmit a system information block S3 and, in response to the trigger, transmit the requested block S3 for receipt by (at least) the requesting terminal. This is shown in FIG. 5 with a signal 22 schematically illustrating occurrence of two different triggers for system information S3, the first trigger illustrated as "tr(S3)-1" and the second trigger illustrated as "tr(S3)-2". Further, the cell may be configured to apply a predetermined delay period Td after receipt of a trigger, before transmitting the requested information. This is illustrated in FIG. 5 with a signal 23 where the delay period Td is applied after occurrence of the first trigger, illustrated as "tr(S3)-1". As shown in FIG. 5, after that, during the delay period Td, three other triggers for the system information block S3 are received by the cell, but the cell need not act on these triggers as the cell is already planning to transmit the system information block S3 upon expiry of the delay period Td. FIG. 5 illustrates that S3 is transmitted when the delay period Td expires. After that, another trigger for the system information block S3 may be received, as shown with a fifth trigger, "tr(S3)-5". The cell may then be configured to again apply the predetermined delay period Td before transmitting the requested block S3 (which second transmission of the requested block S3 is not shown in FIG. 5).

3. Transmit System Information with Reduced Power

The transmit power for a broadcast signal transmitted from a cell is typically selected such that also a terminal at the most distant, in terms of path loss, cell edge will most likely be able to reliably receive the broadcasted information. According to one embodiment of the present invention, in order to save energy, a cell may choose to transmit some system information or system information part(s) with reduced power, for example when the cell estimates the terminal(s) for which the system information part is intended are less distant, in terms of path loss, than at the most distant cell edge. The power to be used for transmitting a system information part from a cell to a particular terminal may be estimated e.g. from the power setting used by the cell for the communication with the terminal via a dedicated channel, on which type of channel the cell typically controls its transmit power to be just sufficient for reception by the terminal of the dedicated channel. For transmitting a system information part to the terminal via a common channel, the cell may choose to apply a higher power setting than for transmission to the terminal via a dedicated channel, thus increasing the probability that the system information transmitted on the common channel can be received and acquired in one transmission, i.e. in most cases not requiring a retransmission of the system information or part(s) thereof.

If no dedicated channel has been established between the cell and the terminal, the cell may estimate a suitable transmit power for transmission of system information via a common channel from a RACH request received from the terminal. Such a RACH request may contain an indication of the power with which the terminal transmitted the RACH request. The cell, measuring the power with which it received the RACH request, is then able to determine the path loss the RACH request experienced from the difference between the terminal's transmit power and the cell's receive power. The cell may then be configured to use this information and the fact that path loss in the uplink and downlink directions is typically the same to estimate a suitable transmit power for transmitting system information to the terminal via a common channel.

Yet another way to estimate a suitable transmit power for transmitting system information from a cell to a terminal may be based on the power with which the terminal received some signal from the cell. Such measurements may e.g. be made by the terminal in the context of cell re-selection and/or handover. In the context of a handover, such information is typically provided to the network, and the network, possibly via a different cell, may provide relevant parts of such information to the cell expected to transmit system information to the terminal. Otherwise, the terminal may provide measurement information directly to the cell.

When a cell transmits system information or part thereof to multiple terminals at the same time, the reduced power to be applied may be determined by the most distant, in terms of path loss, terminal among these multiple terminals.

4. Transmit a Reduced Fraction of System Information or System Information Part (e.g. only the Delta)

For example, when a terminal is performing a handover from one cell to a new cell, the terminal needs to be informed about the neighbor list of the new cell. Typically, each cell transmits its neighbor cell list. However, the old cell and the new cell may share some neighbors, such that transmitting the full neighbor cell list to the terminal making a handover contains duplicate information. According to an embodiment of the present invention, instead of transmitting a full neighbor cell list, the cell (either the new cell or the old cell) may suffice to transmit only the difference or delta between the two lists. Such a delta transmitted by the new cell could e.g. contain information indicating that old cell ID11, ID12, . . . etc. should be deleted and that new cell ID21, ID22, . . . etc. should be added. The delta lists for multiple terminals may be combined in a single transmission. This may also be done if terminals handed over to the new cell originate from different old cells, e.g. by the terminals ignoring a delete instruction referring to a cell ID not contained in the terminal's neighbor cell list and by ignoring an add instruction referring to a cell ID already present in the terminal's neighbor cell list.

The new cell may be configured to monitor the rate of handovers directed to the cell, to monitor also the old cells from which these handovers were made and to choose a system information transmission strategy which the cell considers or estimates to be most resource-efficient.

This approach could also be applied to many other parameters distributed via system information, such as handover parameter settings, which quite often have a same value in many cells in a network. For example, if a handover is made from an old cell to a new cell, and if at least some particular parameters have the same value in both cells (e.g. handover settings), the new cell may refrain from transmitting in its system information these particular parameters. In other words, the difference (delta) between these particular parameters (parameter values) in the old cell and the new cell is zero. In other cases, e.g. if a handover is made from another old cell to the new cell and if some particular parameters (e.g. handover settings) in the new cell differ from those in the old cell, the new cell may transmit in its system information at least these parameters such that the terminal may obtain and apply the parameters associated with the new cell (e.g. replace an old parameter value by the new parameter value or add a new parameter).

5. Transmit System Information via a Dedicated Channel

A fifth way to improve the energy efficiency of distributing system information includes, rather than using the usual broadcast channel and transmitting the system information to all terminals that possibly might be present in the cell's coverage area, transmitting the system information or part thereof to only a particular terminal via a dedicated channel.

This solution may not apply or may not be practical for all system information parts or all system information elements. For example, it would not apply to particular system information part that is required to request or set up a dedicated channel. Also, it may be not practical for system information parts or system information elements typically used in cell search. Then, the additional (energy) overhead (both for the terminal and the network) for setting up a dedicated channel only for the purpose to receive some system information part, may be a larger burden than the gain achieved by using a dedicated channel instead of a broadcast or common channel.

However, distribution of system information via a broadcast or common channel may be efficient if multiple terminals are receiving system information or a system information part and when this system information was unavailable to the terminals before the system information transmission. For example, informing ten terminals simultaneously with a single system information transmission is more efficient than informing only a single terminal. However, for such a transmission, typically a high transmit power is used in order to be certain to be able to also reach the most distant, in terms of path loss, of the intended terminals. If only a few terminals are receiving and acquiring the transmitted information, the energy efficiency of such a transmission is doubtful. If only a single terminal is receiving and acquiring the transmitted information, the information is provided in an energy-inefficient way. If no terminal is receiving and obtaining the thus transmitted information, the energy is just wasted.

Furthermore, with the trend towards smaller and smaller cell sizes, from macrocell to microcell, picocell, or femtocell, it becomes less and less likely that multiple terminals benefit from a same system information part being transmitted on a broadcast or common channel.

Therefore, according to one embodiment of the present invention, the cell may be configured to transmit at least some system information parts via a dedicated channel from the cell to a particular terminal. Because a dedicated channel is typically power-controlled, transmission of a given amount of data to a single terminal via a dedicated channel is likely to be more energy efficient. Moreover, dedicated channels typically operate in both directions, in the downlink direction from the cell to the terminal and in the uplink direction from the terminal to the cell, such that an erroneous reception of some system information part or system information element may be quickly and efficiently corrected by a retransmission requested by the terminal. In addition, the use of a dedicated channel very well suits the terminal to trigger a cell, e.g. with an explicit trigger, to transmit system information or part thereof and also to only transmit the system information part(s) or system information element(s) as actually needed by and requested by the terminal, including using the 'difference-only' or 'delta' option as described above.

In various implementations, not all combinations of the above-described five power saving options may be equally suitable and/or applicable, while others may be more easily combined. For example, using a dedicated channel for the transmission of system information to a terminal (option #5 described above) may very well be combined with only transmitting a delta (option #4 described above) and/or with an implicit and/or explicit triggering (option #2 described above). Also using an implicit and/or explicit triggering (option #2 described above) may very well be used in combination with intermittent transmission (option #1 described above), in particular with a very low repetition rate (i.e. t2 much larger than t1) for selected parts of the system information. In contrast, using intermittent transmission (option #1 described above) may be less applicable for combining it with using a dedicated channel for the transmission of system information to a terminal (option #5 described above) and reduced power (option #3 described above) may already be implied in the use of a dedicated channel.

System Information Modification and/or Refresh (Validation)

A special case of distribution of system information includes a cell updating (i.e. modifying) a particular system information part. The modified system information part should be distributed over at least those terminals that earlier received the 'outdated' system information and are still in the cell's coverage area. This may be most efficiently performed by broadcasting at least once the modified system information part.

System information modification may be performed most efficiently as in conventional systems via a broadcast channel or common channel, preferably with a power setting for the most distant terminal. System information notification may be provided via paging channel, as in UMTS, or via the MIB which then should be monitored near-continuously.

The same mechanism of a system information modification may also be applied instead of the currently usual mechanism of a system information validity timer in each terminal. According to an embodiment of the present invention, instead of the terminal-driven validity timer, the cell may be configured to maintain a refresh timer. When the cell's refresh timer expires, the cell may be configured to announce a refresh, e.g. similar to a system information modification, and broadcasts the full set of system information at least once, such that all terminals currently in its coverage area may refresh and/or check existing system information parts and additionally complement and store currently still missing system information parts.

Solutions #2-4: General System Description

Figure 6:
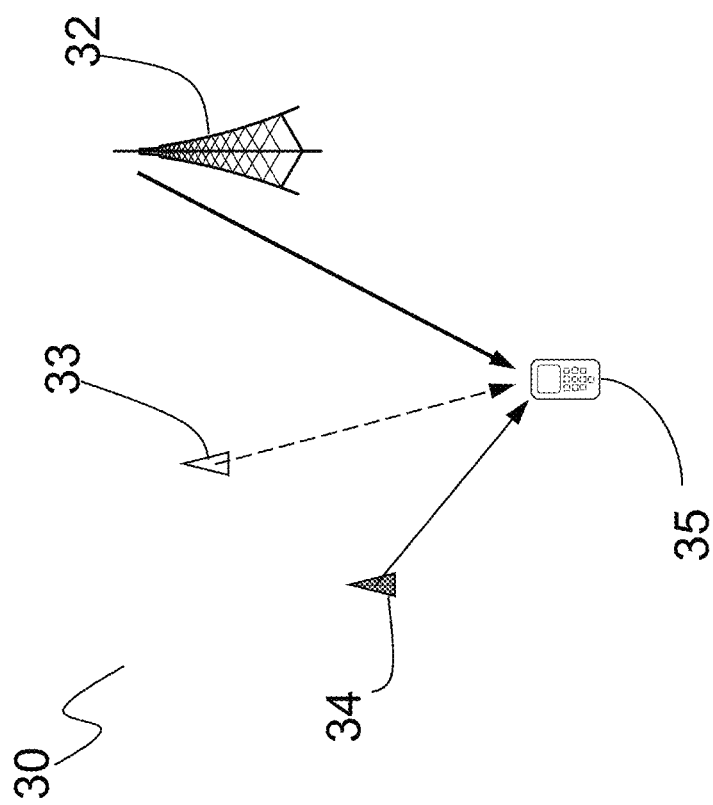
FIG. 6 is a schematic illustration of an energy-efficient telecommunications system, according to an embodiment of the present invention.

Solutions #2-4 are described in the context of a telecommunication system 30 illustrated in FIG. 6. As shown in FIG. 6, according to one embodiment of the present invention, the telecommunication system 30, which is preferably a cellular wireless access telecommunication system, includes at least an LA-cell 32, and SA-cells 33 and 34. FIG. 6 also illustrates a user terminal 35. For clarity reasons, only the most relevant elements of the telecommunication system are illustrated in FIG. 6. Other elements, not shown in FIG. 6, may also be present and are within the scope of the present invention. Such "other elements" may include e.g. additional SA-cells, additional LA-cells, additional terminals, further network nodes such as e.g. management entities, as well as further elements to the telecommunication system and the backhaul links connecting each cell with the telecommunication system and/or with each other.

Below, a general description of each of the LA-cell 32, the SA-cells 33, 34, and the terminal 35 is provided. A more detailed description of the functionality of each of these elements is provided in the discussion of the different solutions, following the general description.

The LA-cell 32 is an LA-cell cell configured to at least be able to enable terminal 35 to camp on LA-cell 32 and to page the terminal 35 in a conventional manner known in the art. According to some embodiments of the present invention, the LA-cell 32 is also configured to receive service request messages from the terminal 35 indicating that a data connection needs to be established between the terminal 35 and one of the SA-cells for supporting wireless traffic (i.e. wireless exchange of user data), not shown in FIG. 6. While the LA-cell 32 is not primarily intended to be used to carry wireless user data from/to the terminal 35, it is not precluded that other signalling than paging or that also some user data traffic is carried via the LA-cell 32, for example low bit rate traffic (such as a voice call) for the full duration or for a part of the duration of the data session (call).

In comparison with the SA-cells 33 and 34, the LA-cell 32 is typically configured to cover a larger geographical area with a smaller bit rate. The geographical area where an idle terminal selects the LA cell to camp on is referred to as the coverage area of the LA-cell. In a properly dimensioned cell, a terminal within that area is usually also capable of successfully receiving the system information and signalling messages from the LA-cell (for example a paging message). This is assumed to also apply in the reverse direction, i.e. when a terminal, camping on an LA-cell, transmits a signalling message (for example a service request message) to the LA cell it is camping on, the LA cell is usually capable of successfully receiving the message. In the intended coverage area of the wireless access network it may be assumed that at least one LA-cell (in FIG. 6, the LA-cell 32) is fully operational or 'normally on' and is capable of supporting exchange of signalling messages with the terminals. In a simplest embodiment, this may mean that the LA cell 32 is always fully functional ('on'). In other embodiments, power-saving options suitable for LA-cells may be applied to the LA-cell 32, meaning that the LA-cell 32 would not necessarily always be 'on'.

The terminal 35 may be a terminal operated by an actual human user, such as e.g. a mobile phone with which the user can make a voice call or browse the Internet, but may also be a smart phone or a data-centric terminal (e.g. laptop or tablet computer) operating without human intervention (e.g. sending/receiving e-mail), and may also be an MTC (Machine-Type Communications) device, such as e.g. a smart electricity meter, a car navigation device or a camera surveillance device.

The terminal 35 may be in an active mode or in an idle mode. As used herein, the terminal 35 is said to be in an idle mode while there is no support for a wireless exchange of user data or traffic between the terminal 35 and the SA-cells 33 or 34. As used herein, the terminal 35 is said to be in an active mode when it is able to exchange data with at least one of the SA-cells 33, 34. Note that while these notions of idle mode and active mode may be comparable with the meaning of like terms in standardized conventional networks, as used herein, they do not necessarily coincide exactly with such standardized definitions.

Further, the terminal 35 may support some form of power-saving options (i.e., be in a power-save mode or in an operational mode, where the terminal consumes less power in the power-save mode than in the operational mode). Since the differentiation between power-save and operational modes is based on the amount of power consumed by the terminal, while the differentiation between idle and active modes is based on the presence of the support for wireless exchange of user data with the SA-cells, a terminal may e.g. be in the operational mode but still be an idle terminal (or the terminal in the operational mode may be in active mode). Similarly, a terminal in a power-save mode can be either active or idle, depending on whether the terminal supports wireless exchange of user data with at least one of the SA-cells. Most common, however, would be a situation where an idle terminal in a power-save mode "wakes up" (i.e. exits the power-save mode and enters the operational mode) to perform certain actions to facilitate establishment of a data connection with at least one SA-cell, after which the terminal becomes "active" (and operational). Since the embodiments of the present invention deal with distribution of system information which may be relevant for the terminal, in the following description, the differentiation is mainly made between idle and active modes of the terminal.

The terminal 35 in an idle mode may be assumed to 'camp' on at least the LA-cell 32, which may also be realized in a conventional manner. For example, the LA-cells may broadcast a pilot signal or a beacon signal which can be received by the terminal 35 which then uses the information contained in the received signal to select or re-select the LA-cell to camp on. In FIG. 6, the signals transmitted by LA-cell 32 and received by the terminal 35 are illustrated as a solid arrow from the LA-cell 32 to the terminal 35. In an embodiment, the terminal 35 may be capable of informing the network about the change of location/routing area in order to facilitate the paging function of the LA-cell 32, not shown in FIG. 6.

The SA-cells 33 and 34 are primarily intended to carry user data traffic from/to the terminal 35 over the data connections established for that purpose, e.g. via a dedicated channel. However, it is not precluded that also some other information and/or some signalling is carried via one or more of the SA-cells.

Each of the SA-cells 33 and 34 is typically configured for covering a smaller area with a higher bit rate, as opposed to the LA-cell 32. In a typical deployment scenario, the areas that can possibly be covered by nearby SA-cells may show a considerable overlap. In the intended coverage area of the wireless access network it may be assumed that at least one of the SA-cells 33, 34 is able to provide coverage. An SA-cell is only fully operational when and to the extent that it is needed or, in other words, is 'normally off'. An SA-cell is assumed to support at least one form of power-saving, e.g. a power-save mode or stand-by mode. To that end, an exemplary embodiment of FIG. 6 illustrates that the SA-cell 33 is an SA-cell in a power-save mode (indicated in FIG. 6 as a white triangle), while the SA-cell 34 is an SA-cell in an active mode (indicated in FIG. 6 as a dark triangle). In FIG. 6, the signals transmitted by active SA-cell 34 and received by the terminal 35 are illustrated as a solid arrow, while a possible signal transmitted by SA-cell 33, which is in power-save mode, and received by the terminal 35 is illustrated as a dashed arrow.

Each of the terminal 35, the LA-cell 32, and the SA-cells 33, 34 may include at least one or more of a communications interface for transmitting and receiving information, a memory unit for storing data (possibly received over the communications interfaces), and a processor for processing data and possibly running computer programs on, the communications interfaces, processors, and memory units appropriately configured for carrying out functionalities of these units described herein.

Since in the context of an energy-efficient network which is different from a conventional cellular system, a terminal may have to communicate with both LA-cells and SA-cells, according to various embodiments of the present invention, at least three different configurations are envisioned for the terminal 35 to receive signals from and, where applicable, transmit signals to a cell of either such cell type.

A first configuration for the terminal 35, referred to in the following as "configuration (i)," envisages an active terminal to simultaneously support two radio interfaces—an LA-cell radio interface for communicating with the LA-cell 32 (and possibly other LA-cells not shown in FIG. 6) and an SA-cell radio interface for communicating with the SA-cells 33, 34 (and possibly other SA-cells not shown in FIG. 6). As a person skilled in the art would recognize, this configuration involves some more complexity than a terminal with only a single radio interface. In at least some solutions, such a terminal needs only an LA-cell radio receiver so that the terminal can receive information from the LA-cell via the LA-cell radio interface but the terminal does not need to have capabilities to also transmit information to the LA-cell. In other solutions (e.g. for exchanging signalling information with an LA-cell), such a terminal also needs an LA-cell radio transmitter so that the terminal can transmit information to the LA-cell. Because the exchange of signalling information with an LA-cell only requires low bit rate, the additional complexity, cost and energy consumption in maintaining the LA-cell radio interface may be kept low. The terminal 35 in configuration (i) may, also in active mode, receive signals from and/or exchange data with the LA-cell 32 at any time.

A second configuration for the terminal 35, referred to in the following as "configuration (ii)," envisages a terminal in the active mode to support two radio interfaces, an LA-cell radio interface for the LA-cell(s) and an SA-cell radio interface for the SA-cell(s), in quickly alternating mode of operation, i.e. operating in time division mode. In other words, such a terminal would have, at one moment, the LA-cell radio interface enabled and, at another moment, the SA-cell radio interface enabled. When the terminal 35 in configuration (ii) is in the active mode and actually exchanges data with the SA-cell 34 it is envisaged that the SA-cell radio interface is enabled for the larger part of the time. It is further preferred and envisaged that the exchange of data with the SA-cell 34 is interrupted for only a brief period of time such that the interruption is not aggravating to the terminal user, e.g. less than a fraction of a second, such as 100 ms. A terminal according to configuration (ii) may, also in active mode, reconfigure its radio interface from the SA-cell radio interface to the LA-cell radio interface and then receive signals from and/or exchange data with LA-cells at any time but only for a relatively brief period (e.g. 100 ms) before restoring its radio interface configuration to the SA-cell radio interface. In this manner, a quasi-simultaneous mode of operation may be achieved. In an embodiment, the operations of a terminal having reconfigured its radio interface to LA-cell and the SA-cell transmitting user data to the terminal (and/or transmitting system information to the terminal and possibly also to other terminals) may be synchronized to one other to the extent that an SA-cell does not transmit user data to a particular terminal (and/or transmit system information to this particular terminal and possibly to other terminals) in the period that the terminal has configured its radio interface for receiving data from the LA-cell. Such an embodiment allows avoiding the SA-cell transmitting user data to the terminal in vain, and therewith wasting SA-cell resources. Further, occurrences of a terminal configuring its LA-cell radio interface (and therewith being unable to use its SA-cell radio interface) need not be very frequent and the total time that the terminal has its LA-cell radio interface enabled may only comprise a relatively very small fraction of the time.

A third possible configuration for the terminal 35, referred to in the following as "configuration (iii)," envisages an active terminal supporting two radio interfaces (one for the LA-cell and one for the SA-cell) alternately, yet without the quickly alternating (succession of) operation modes as described for configuration (ii). For example, a quasi-simultaneous mode of operation as described for configuration (ii) is not used, e.g. because it is considered not necessary and/or because the implementation does not support a quick configuration, for example if reconfiguring the radio interface requires more time than to qualify as 'quickly', e.g. more than a second. A terminal according to configuration (iii) is assumed to have its radio interface configured for the SA-cell for the duration of exchanging user data with an SA-cell. Thus, the exchange of user data can be performed at the maximum rate possible, without requiring short interruptions as for configuration (ii). The consequence is that an active terminal according to configuration (iii) may be unable to check whether it still is in the coverage area of the same LA-cell when the data session was established. Also, when the active terminal remains in the same LA-cell coverage area, a system information modification of the LA-cell may be not noticed. Consequently, a terminal having concluded its data exchange via an SA-cell and after having reconfigured its radio interface to LA-cell, a cell search procedure may have to be performed and the LA-cell system information may need to be obtained. In order to not miss e.g. an incoming call or a page message for such a call before the cell search procedure and obtaining sufficient system information has been completed, various approaches that would be known to a person skilled in the art may be followed to repair or at least alleviate this issue.

According to configurations (i), (ii) and (iii), the LA-cell radio interface and the SA-cell radio interface may be two separate physical radio interfaces, with separate RF front ends, or share the same physical radio interface (e.g. in the case that the LA-cell and the SA-cell operate in the same frequency band but on different carriers). In the latter case, the "SA-cell radio interface" and "LA-cell radio interface" only differ in "soft" configurations of a physical radio interface. For configurations (ii) and (iii) a single physical radio interface may be sufficient which is either enabled as an LA-cell radio interface (while the SA-cell radio interface is disabled) or enabled as an SA-cell radio interface (while the LA-cell radio interface is disabled).

As used herein, the term "enabled" for a cell type (SA-cell, LA-cell) in the context of SA-cell or LA-cell radio interfaces being enabled or disabled is used to describe that the interface is able to receive signals from the cell type and to support an exchange of data (which may comprise any type of data such as user data, signalling data, network control messages, etc.) with the cell type, while the term "disabled" is used to describe that the interface is not able to receive signals from and not able to support such an exchange with the cell type. A person skilled in the art will recognize that there are various manners in which an interface may be "disabled." For example, in one extreme embodiment, the disabled radio interface could be a radio interface turned completely off, with no power supply being provided to the relevant part of the electronic components of the interface. In another extreme embodiment, however, the radio interface may be considered to be "disabled" when it is simply not being used even though the interface itself is physically completely up and running. The latter embodiment could be advantageous because the time needed to enable the interface again would be minimum since there would be no or minimum delay in getting the disabled interface ready for operation when it needs to be enabled again. Various other embodiments of how a radio interface could be considered to be disabled that are between these extreme embodiments would be known to a person skilled in the art and are intended to be within the coverage of the present invention.

Figure 7:
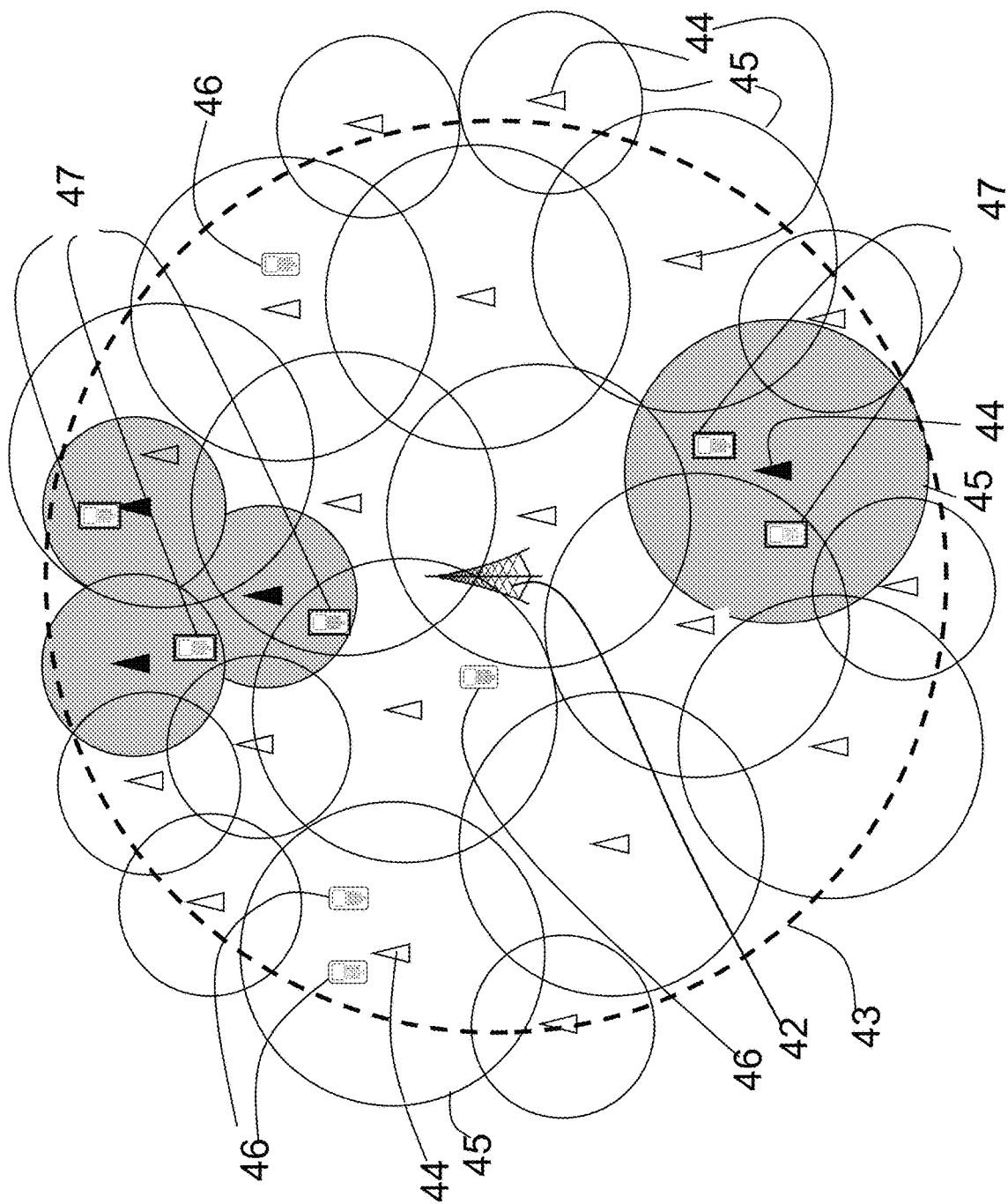
FIG. 7 is a schematic illustration of coverage areas of the LA-cell and a plurality of SA-cells in a telecommunications network, according to one embodiment of the present invention.

FIG. 7 is a schematic illustration of coverage areas of an LA-cell and a plurality of SA-cells in a telecommunications network, according to one embodiment of the present invention. As shown in FIG. 7, an LA-cell 42, which could be the LA-cell 32 illustrated in FIG. 6, may have a relatively large coverage area, shown with a dashed circle 43. Each of the plurality of SA-cells, shown as triangles, such as the triangles 44, could be the SA-cells 33, 34 illustrated in FIG. 6. The SA-cells 44 may have different, relatively smaller coverage areas, shown with solid circles, such as circles 45. FIG. 7 further illustrates idle mode terminals 46 and active mode terminals 47 (the active mode terminals indicated as bold outlined terminals). Each of the terminals 46 and 47 could be the terminal 35 illustrated in FIG. 6 and could be within one or more of the coverage areas 45. The idle mode terminals 46 within the coverage area 43 of the LA-cell 42 are said to be camping on the LA-cell 42. The SA-cells 44 having coverage areas 45 shown in white are intended to illustrate the SA-cells in the power-save mode, while the SA-cells 44 having coverage areas 45 shown in dark grey are intended to illustrate the SA-cells in the active mode and may have ongoing data sessions with one or more active terminals 47. Of course, in other embodiments, the coverage areas 43 and 45 do not have to be circular and do not have to cover an omnidirectional sector around the location of the base station (cell).

Returning to FIG. 6, a typical example of the behavior of the terminal 35 in an energy-efficient network according to an embodiment of the present invention may be as follows. When the terminal 35 has no need to exchange user data with the network (i.e. an idle terminal), it will camp on the LA-cell 32, much in the same way as in conventional networks an idle terminal camps on a cell. When the terminal 35 has a need to exchange user data with the network (i.e. needs to enter into an active mode) it establishes a data session with an appropriate SA-cell in the network, in FIG. 6 shown as the SA-cell 34. For highest energy efficiency, the appropriate SA-cell may have previously been deactivated (i.e. may have been switched off or may have entered into an energy-conserving state), and may need to be activated (i.e., woken up) to support the data session. When the data session has been established, the terminal 35 may exchange user data (and possibly also signalling), e.g. via a dedicated channel, via/with the SA-cell 34. When an active terminal 35 no longer has a need to further exchange user data with the network, the data session may be terminated. For highest energy efficiency, the SA-cell 34 may then be deactivated (i.e. may be switched off or may enter into an energy-conserving state) if the SA-cell has no or only little remaining traffic (in the latter case after transferring remaining sessions to another SA-cell). The terminal 35 will resume to idle mode, camping on an LA-cell, which may be the same LA-cell it was camping on before establishing the data session (i.e., the LA-cell 32) or it may be a different LA-cell if the terminal moved into another LA-cell's coverage area.

Solution #2: LA-Cell Distributes LA-cell System Information, SA-Cell Distributes SA-Cell System Information in an Energy-Efficient Network In the context as illustrated in FIGS. 6 and 7 and described above, the terminal 35 is first assumed to be an active terminal configured to exchange user data with the SA-cell 34 via a data connection established between the terminal 35 and the SA-cell 34 for that purpose, e.g. via a dedicated channel. Embodiments of solution #2 address the problem of the terminal 35 obtaining SA-cell system information comprising system information regarding at least the SA-cell 34 and LA-cell system information regarding the LA-cell 32, as well as, possibly, system information regarding other SA-cells and other LA-cells in the network 30 which may be relevant for the terminal 35.

Figure 8:
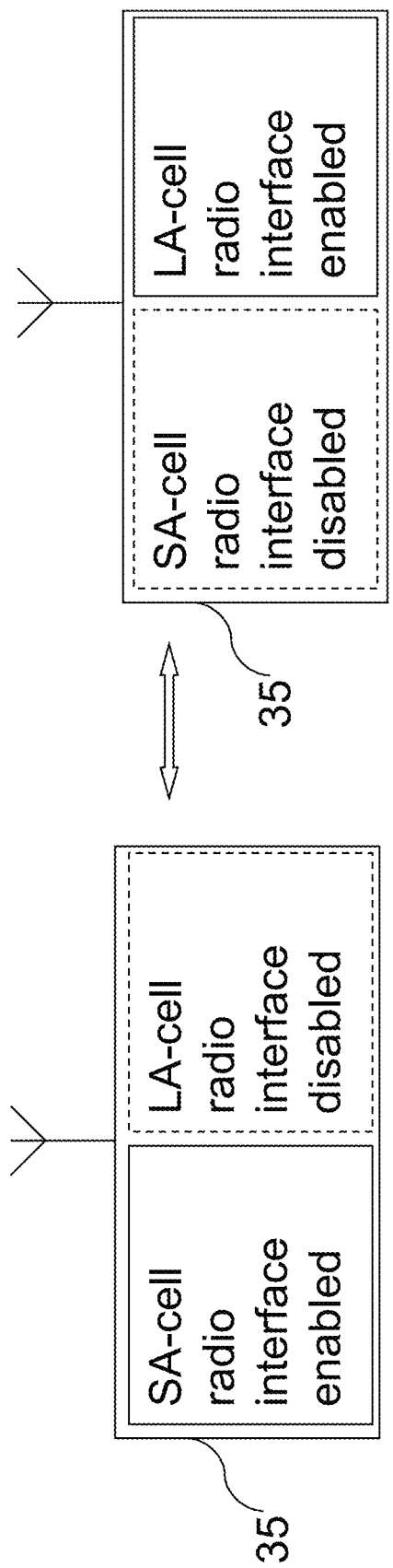
FIG. 8 is a schematic illustration of an SA-cell radio interface and an LA-cell radio interface of a terminal being enabled alternatively in a time-multiplexing mode, according to one embodiment of the present invention.
Figure 9:
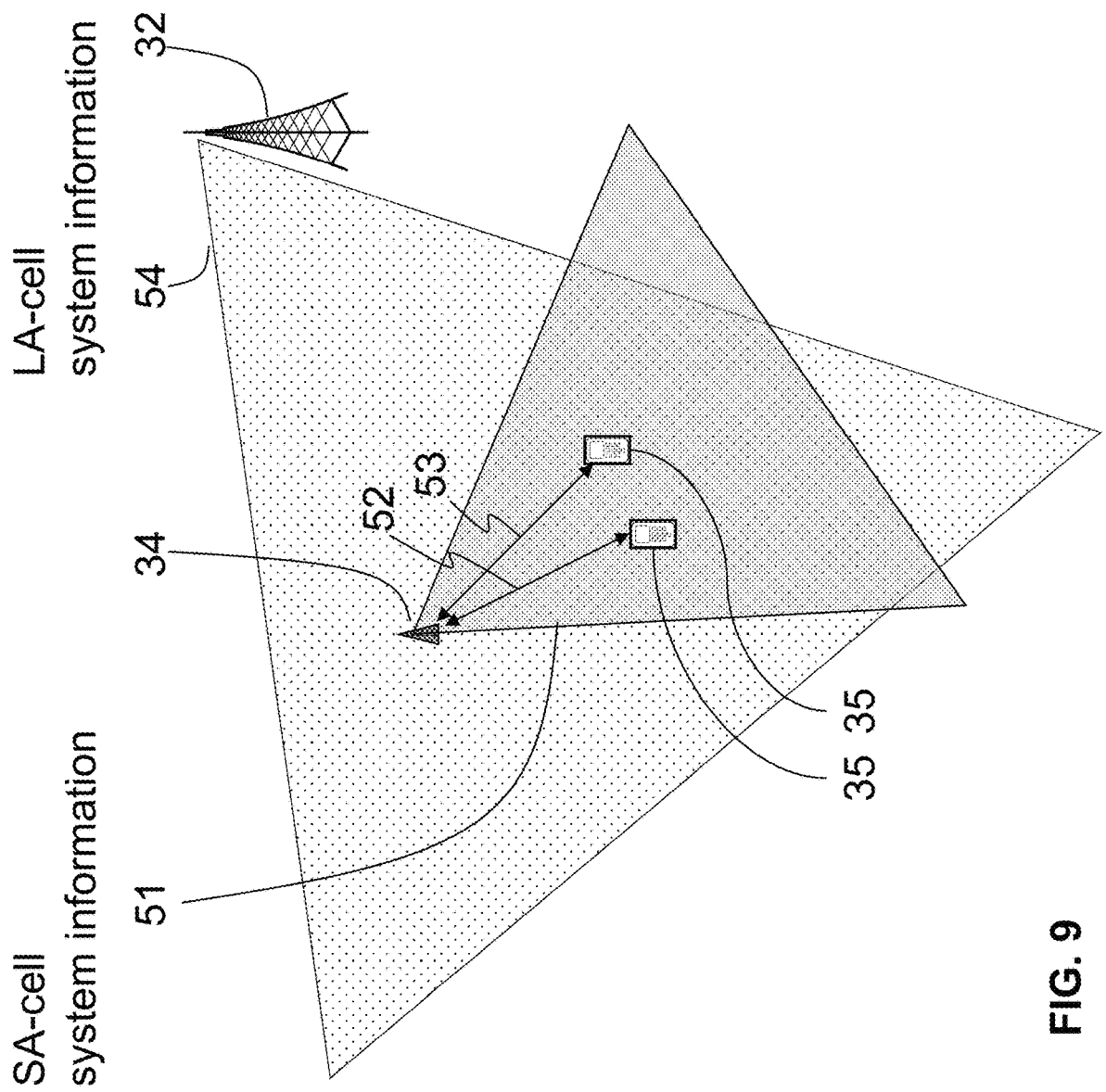
FIG. 9 is a schematic illustration of an SA-cell providing SA-cell system information and an LA-cell providing LA-cell system information to a terminal, according to one embodiment of the present invention.

Embodiments of this solution are based on the idea that the LA-cell 32 transmits its LA-cell system information and the SA-cell 34 transmits its SA-cell system information and that the SA-cell radio interface and the LA-cell radio interface of the terminal 35 in the configuration (ii) are enabled alternately in a time-divided multiplexing mode, as is schematically illustrated in FIG. 8. The LA-cells and the SA-cells may transmit their respective system information, as is schematically illustrated in FIG. 9 with the SA-cell 34 transmitting its system information via broadcast channel 51, illustrated as a grey triangle, and/or via dedicated channels 52, 53, illustrated as double-pointed arrows, to the individual active terminals 35 and with the LA-cell 32 transmitting its system information via broadcast channel 54, illustrated as a dotted triangle. When the terminal 35 is in the idle mode, the terminal 35 is configured to receive transmission of the LA-cell system information by the LA-cell 32 that the terminal is camping on, via the LA-cell radio interface enabled for such an idle terminal. The SA-cell radio interface may then be disabled. When the terminal 35 is in the active mode and actually exchanges data with the SA-cell 34 via its established data connection, for the larger part of the time, the SA-cell radio interface of the terminal 35 is enabled and the LA-cell radio interface is disabled. In that time, the terminal 35 may exchange user data with the SA-cell 34 as well as receive other signals, including system information, from the SA-cell 34 and the terminal 35 may also receive signals, including system information, from other SA-cells in the network 30. The remaining, smaller, part of the time, the LA-cell radio interface of the active terminal 35 is enabled and the SA-cell radio interface is disabled. In that time, the terminal 35 may receive signals, including system information, from the LA-cell 32 as well as, possibly, support a signalling connection via the LA-cell 32 and the terminal 35 may also receive signals, including system information, from other LA-cells in the network 30. In this manner, a terminal in an active mode and exchanging data with an SA-cell via an SA-cell radio interface may be configured to temporarily interrupt or pause its exchange of user data with the SA-cell and to enable its LA-cell radio interface at one or more of particular times when the LA-cell or LA-cells are expected by the terminal to transmit their system information so that the terminal may receive LA-cell system information transmitted by one or more LA-cells. Such a terminal is configured to receive the SA-cell system information from one or more SA-cells when the SA-cell radio interface is enabled.

With the terminal 35 configured according to the configuration (i) described above, with two simultaneously operating radio interfaces, operating 'in parallel' as it were, the various approaches outlined under solution #1 can be used. Embodiments of the solution #1 can be applied to the distribution of system information by each of the LA-cells and the SA-cells to be received by the terminal 35 via the corresponding radio interface, independent of the other radio interface.

Figure 10:
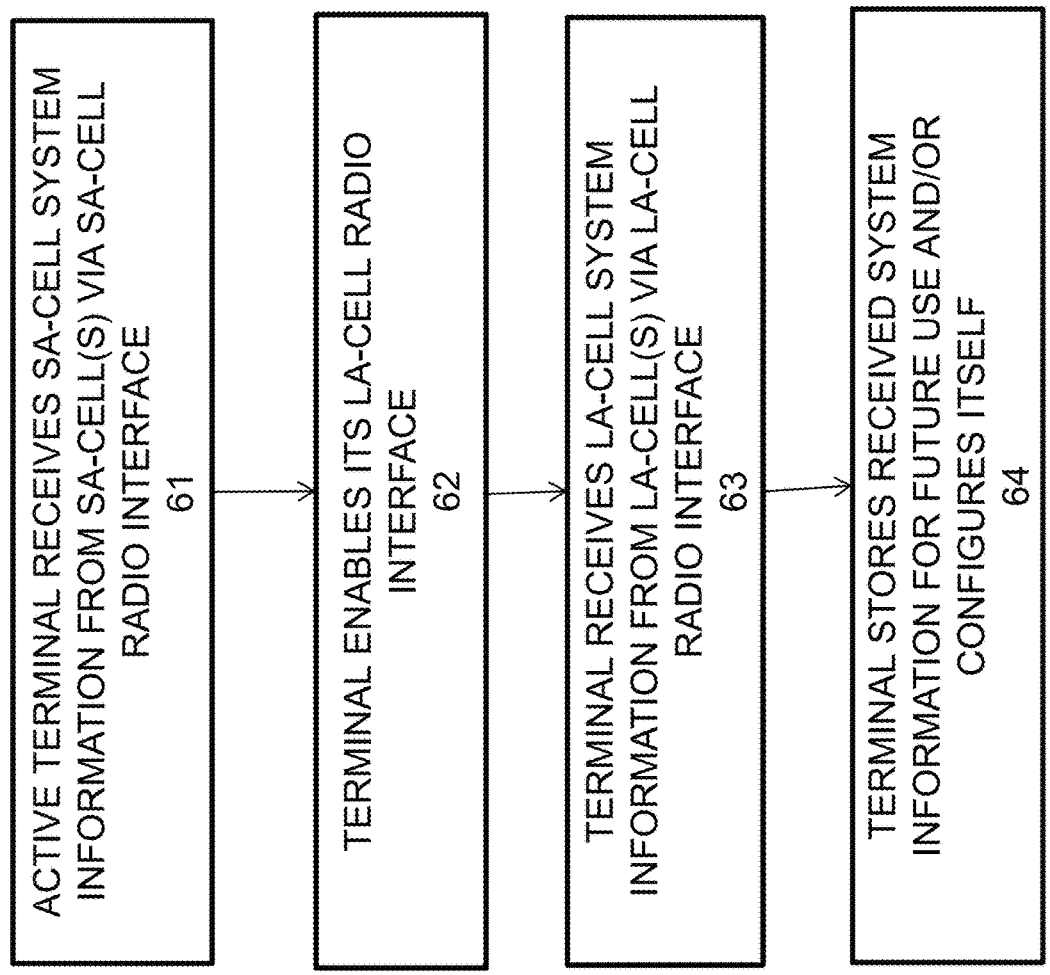
FIG. 10 sets forth a flow diagram of method steps for obtaining system information for one or more SA-cells and system information for one or more LA-cells, according to one embodiment of the present invention.

FIG. 10 sets forth a flow diagram of method steps for obtaining system information regarding one or more SA-cells and system information regarding one or more LA-cells, according to one embodiment of the present invention. While the method steps are described in conjunction with FIG. 6, persons skilled in the art will recognize that any system configured to perform the method steps, in any order, is within the scope of the present invention.

The method begins in step 61, where the terminal 35 is in the active mode and the SA-cell radio interface of the terminal 35 is enabled. The terminal 35 then receives at least a part of the SA-cell system information regarding the SA-cell 34 from the SA-cell 34 via the SA-cell radio interface of the terminal (of course, the terminal 35 may also exchange data with the SA-cell 34). The terminal 35 may then also receive SA-cell system information from other SA-cells relevant for the terminal 35. In step 62, the terminal 35 enables its LA-cell radio interface during one or more of a plurality of LA time periods to receive, in step 63, LA-cell system information for the LA-cell 32 via the enabled LA-cell radio interface. With the terminal 35 configured according to configuration (ii), with two quickly alternating (quasi-simultaneous) radio interfaces, it is preferred that the LA-cell 32 transmits its system information for only a fraction of the time, e.g. during 100 ms (or less). It is also preferred that the LA-cell transmits its system information in predetermined periods of time or at least starts transmitting its system information at predetermined moments in time, e.g. a cyclic repetition of 100 ms LA-cell system information transmission each second. The pattern for transmitting the LA-cell system information may either be set by the LA-cell 32 itself or by some other network entity such as e.g. a network management or OAM (Operation, Administration and Maintenance) entity and/or a synchronization entity. When an indication of when the transmission of the LA-cell system information takes place is provided to the terminal 35, the active terminal is able to reconfigure its radio interface to LA-cell, e.g. just before the LA-cell system information transmission is expected to start, to receive the LA-cell system information and, optionally, also perform other LA-cell-related operations such as measuring its signal strength in order to assess whether the terminal 35 is still in the coverage area of the LA-cell 32. When that is finished, the terminal 35 may reconfigure its radio interface back to the SA-cell (and also may continue exchanging e.g. user data via the SA-cell 34).

In an optional step 64 the terminal 35 may configure one or more of its settings based, at least partially, on the received SA-cell system information and/or the received LA-cell system information. In an embodiment, the terminal 35 may be configured to store at least a part of the received system information, both for the SA-cell(s) and the LA-cell(s), for future use. In this respect it may be noted that the SA-cell system information transmitted by SA-cell 34 is not restricted to regard exclusively SA-cell 34, it may also regard one or more other, active or inactive, SA-cells in the network, e.g. neighboring SA-cells, such as SA-cell 33 as shown in FIG. 6. A terminal 35 receiving and storing also SA-cell system information regarding another SA-cell than just the serving SA-cell 34 is considered an advantage, e.g. in case of a handover to a different, e.g. neighboring, SA-cell. Then, the system information or the most relevant part thereof regarding the new SA-cell can already be obtained by the terminal before performing the handover, instead of after the handover. Such 'advanced' obtaining of system information regarding another cell than the serving cell facilitates the handover to be completed more quickly compared to the usual approach where most of the system information is only obtained after having performed the handover. Being able to quickly perform a handover is in particular a premium in cases where due to a small cell size, which is typical for an SA-cell, and high terminal mobility, the sojourn time in a particular cell, such as an SA-cell, is relatively short. Such 'advanced' obtaining of system information regarding another SA-cell than just the serving SA-cell is also in particular an advantage in energy-efficient networks, where a target SA-cell for a handover may still be in an inactive state (e.g. SA-cell 33 in FIG. 6) and needs to be re-activated before being fully operational. During the period of re-activation the SA-cell may not yet be fully capable of transmitting its SA-cell system information such that a terminal 35 may advantageously use the stored system information for that particular SA-cell to configure itself for the handover. Similarly, the system information transmitted by LA-cell 32 is not restricted to regard exclusively LA-cell 32, but may also regard one or more other LA-cells in the network (not shown in FIG. 9), e.g. neighboring LA-cells, though the above-mentioned advantages apply to the LA-cells to a lesser extent. A similar advantage of storing system information applies to an active terminal, having kept up to data the LA-cell system information, and reverting back to idle mode when exchange of user data has been completed. For example, when the terminal 35 becomes idle again, the terminal is likely to apply the stored LA-cell system information to configure its settings. In all cases it is preferred that the terminal is enabled to quickly check whether the stored system information for a particular cell (SA-cell or LA-cell) is still valid. This may be realized in a conventional manner, e.g. by a system information version numbering. For broadcasted system information, such version number is preferably frequently broadcasted; for system information provided via a dedicated channel it is suggested that the terminal transmits an indication of the stored system information version number to the cell and that the cell responds either with a confirmation that this version is still valid or with the most recent version number and provides the most recent (i.e. valid) parts of those system information parts which have been modified since the version number indicated by the terminal. There are various manners how the network 30 may be configured so that the terminal may obtain the SA-cell and the LA-cell system information, referred to herein as a "very simple configuration," "more flexible configuration," and "most flexible configuration," which are described in greater detail below.

Very Simple Configuration

In a very simple configuration, an SA-cell, e.g. the SA-cell 34, is configured to transmit user data to each of the active terminals 35 the SA-cell serves only in periods not overlapping with predetermined periods of time an LA-cell, e.g. the LA-cell 32, is configured to transmit the LA-cell system information, e.g. the LA-cell 32 transmits LA-cell system information for 100 ms each second and the SA-cell 34 transmits user data for the other 900 ms each second. In other words, the predetermined periods of time for the LA-cell system information transmission are reserved for allowing a terminal to receive and obtain the LA-cell system information and not for receiving user data via the SA-cell, thereby reducing the SA-cell's achievable throughput for user data, in this example to 90% compared to a situation where the SA-cell could transmit user data for 100% of the time. The periods when the SA-cell may transmit user data will now be referred to in this example as "first periods" while the predetermined periods when the LA-cell is configured to transmit its LA-cell system information may be referred to as "second periods." While the first and second periods are configured to not overlap each other, they don't have to be adjacent periods (i.e., there may be gaps between these periods) as some additional margin may be applied, e.g. to allow the reconfiguration of a terminal's radio interface to be completed and to allow for some inaccuracies between the timing of both cell types.

Because an SA-cell may have more than a single LA-cell partially overlapping the SA-cell coverage area, the SA-cell for its first periods would be required to take into account the second periods of each of the relevant LA-cells. To avoid a further reduction of the fraction of time the SA-cell has available for its first periods (and therewith further reducing the achievable throughput) it is preferred that the LA-cells synchronize their second periods to each other such that these occur as much as possible overlapping, e.g. substantially simultaneously. Using the above example, the second periods of 100 ms each second would be used substantially simultaneously by all LA-cells relevant for the SA-cell.

In this very simple configuration, there are two alternatives for how the SA-cell may transmit its system information. In the first alternative, the SA-cell may be configured to transmit SA-cell system information during the second period (i.e. the period when no user data is transmitted), possibly also in the gaps between the first and second periods but not during the first period. In this alternative, the SA-cell system information may be transmitted at a relatively high data rate because, in these periods, the SA-cell does not need any transmit resources for user data and, thus, a large amount of SA-cell system information may be transmitted in a relatively short time. In the second alternative, the SA-cell may be configured to transmit SA-cell system information any time, including transmission of the SA-cell system information during the first periods, during the second periods, and/or during the gaps. In a further embodiment of this, second, alternative, in the second period and possibly also in the gaps, the SA-cell system information transmission rate may be set to a relatively high rate, e.g. to the rate comparable to that of the first alternative. For both alternatives, the SA-cell is not restricted in the periods in which it may receive user data from the terminal; the SA-cell may be configured for receiving any time, where the terminal may choose whether or not to transmit user data to the SA-cell. Note that, when the system is configured to operate in a TDD (Time Division Duplex) mode, it is common that there are (possibly predetermined) time slots assigned for downlink transmission from a cell to a terminal and other time slots assigned to uplink transmission from a terminal to a cell. Then, of course, the above configurations have to be fitted into the TDD time slots assigned for downlink and for uplink transmission, respectively.

The LA-cell may be configured to transmit LA-cell system information for an active terminal only during the second period (i.e. not during the first period and also not in the gaps). In an alternative, the LA-cell may be configured to also transmit some LA-cell system information outside the second period, e.g. system information not intended for an idle terminal and/or (partially) the same system information transmitted in a different format (e.g. at a lower bit rate, simpler coding, etc.) to better suit an idle terminal. The exchange of data via an LA-cell, e.g. for supporting a dedicated signalling connection and/or the exchange of some user data via the LA-cell, may be performed any time (in case of TDD, of course, taking into account the assigned time slots as mentioned above).

In a network where multiple LA-cells may be transmitting their system information, in one embodiment, the different LA-cells may be configured to synchronize transmission of their system information to occur substantially simultaneously, e.g. some time within the time period of 100 ms. An advantage of such implementation is that the SA-cell needs not differentiate between terminals and/or between the LA-cells to which the terminals may be associated and that the SA-cell needs only schedule a single user data transmission-free period of 100 ms. A disadvantage of such implementation may be that the terminal may possibly receive and acquire system information from only a single LA-cell in any one 100 ms time period. In another embodiment, the different LA-cells may be configured to synchronize transmission of their system information to occur substantially in consecutive periods of e.g. 100 ms. In such an embodiment, the terminal has the advantage of being able to receive and acquire system information from several (e.g. two) LA-cells in the corresponding consecutive 100 ms time slots. The disadvantage of such an implementation is a further reduction of the achievable SA-cell throughput of user data and, possibly, the need of a per-terminal (or at least per pair of LA-cells) scheduling of SA-cell transmission-free periods.

An active terminal not in need for any LA-cell system information may be configured to keep its radio interface configured to the SA-cell, may transmit user data any time, may receive user data during the first periods and may receive SA-cell system information during the second periods (and possibly also during the gaps). An active terminal that wants to receive LA-cell system information may be configured to continue transmitting and/or receiving user data during the first period. Then, towards the end of a first period, the terminal would reconfigure its radio interface to the LA-cell (a time gap may facilitate this), receive the LA-cell system information, and, not later than towards the end of the second period, reconfigure its radio interface to the SA-cell (a time gap, again, may facilitate this). After that, the terminal may resume transmitting and/or receiving user data via the SA-cell during the next first period.

As the foregoing illustrates, in this configuration, in particular in the first alternatives for the SA-cell system information and for the LA-cell system information, the transmissions of system information by the SA-cell and the LA-cell are coordinated to occur substantially simultaneously during the second periods, where the SA-cell system information transmission may additionally take place in gaps between the first and second periods.

More Flexible Configuration

In this configuration, there is no predetermined repeated sequence of a first time period and a second time period.

An SA-cell may transmit user data to a particular terminal either continuously or an SA-cell may transmit user data with interruptions or pauses in downlink user data transmission, where the pauses in the SA-cell user data transmission are predetermined and specified, indicated, and/or commanded to the SA-cell beforehand by the particular terminal. Thus, the terminal is enabled full control over if and when the terminal would need an SA-cell user data transmission-free period, e.g. for the purpose of receiving system information from one or more LA-cells, making signal level measurements on one or more LA-cells, and/or for contacting (e.g. exchanging signalling information with) one or more LA-cells. This also allows a terminal-specific and occasion-specific sizing of the SA-cell's user data transmission-free period. For example, a terminal which implements a slow reconfiguration of its radio interface may command a longer SA-cell transmission-free period than another terminal implementing a quick reconfiguration of its radio interface or a terminal requiring only a particular system information part may command a shorter SA-cell transmission-free period than the exemplified 100 ms, positioned around the expected transmission time of the particular system information part, than another terminal aiming to receive and obtain the full system information in an e.g. 100 ms period.

In this more flexible configuration, when an SA-cell interrupts its downlink user data transmission to a particular terminal, the SA-cell may continue transmitting user data to other terminals for which no interruption is specified.

For transmission of the SA-cell system information by the SA-cell, all options as described for the previous configuration are open without any strong preference. For example, the SA-cell may be configured to transmit its SA-cell system information in the conventional, near-continuous, manner at a modest bit rate. In another example, the SA-cell may be configured to transmit its SA-cell system information in short bursts at a higher bit rate.

The SA-cell may be configured to receive user data at any time; the terminal may choose whether or not to transmit user data to the SA-cell (in case of TDD, of course, taking into account the assigned time slots as mentioned above).

The LA-cell may be configured to transmit its LA-cell system information preferably in short bursts and preferably according to a predetermined schedule (e.g. periodically), predetermined by the LA-cell or other network node, such as e.g. some network management entity or a synchronization entity, and known to or detectable by a terminal monitoring the LA-cell. Corresponding to the LA-cell alternative described above for the "very simple configuration", it is an option in this configuration as well that an LA-cell also transmits some LA-cell system information outside the second period.

The exchange of data via an LA-cell, e.g. for supporting a dedicated signalling connection and/or the exchange of some user data via the LA-cell, may be performed any time (in case of TDD, of course, taking into account the assigned time slots as mentioned above).

An active terminal not in need for any LA-cell system information may keep its radio interface configured to the SA-cell, may transmit user data any time, may receive user data any time and may receive SA-cell system information any time (at least when the SA-cell system information is transmitted). An active terminal that needs LA-cell system information may be configured to first provide an indication to the SA-cell with which the terminal has a data connection as to when the SA-cell should pause (interrupt) its downlink transmission of user data to that particular terminal. To that end, the terminal may provide an indication of e.g. a single interruption with specified start time and end time, a single interruption with specified start time and duration of the interruption, or multiple interruptions, e.g. according to a periodic schedule. A period of time when the SA-cell downlink user data transmission is paused (interrupted) may be compared to the second time period described in the "very simple configuration," with the difference that, in this more flexible configuration, such a period is terminal-defined and terminal-specific and may occur not at all, may occur once or may occur repeatedly (possibly with different durations). The terminal, after having provided an indication to the SA-cell, may then continue transmitting and/or receiving user data until the interruption start time. At or after the start time, the terminal may reconfigure its radio interface to the LA-cell. The time to do so is assumed to be known to the terminal and is assumed to be taken into account when specifying the downlink user data interruption start time to the SA-cell. The terminal with enabled LA-cell radio interface may then receive LA-cell system information or at least the relevant part of that information, and, not later than towards the interruption end time, reconfigure its radio interface back to the SA-cell. Similar to the time for reconfiguring the terminal radio interface to the LA-cell, the time to reconfigure the terminal radio interface to the SA-cell is assumed to be known to the terminal and is assumed to be taken into account when specifying the downlink user data interruption end time to the SA-cell. The terminal may then resume transmitting and/or receiving user data from the interruption end time onwards.

As the foregoing illustrates, this configuration does not require a coordination of the transmission of system information by an SA-cell and an LA-cell. However, it could happen that a terminal that needs to monitor LA-cell system information, and during those times ('second time periods') is unable to monitor the SA-cell system information, would repeatedly and consistently miss all SA-cell system information. This could happen if SA-cell system information is transmitted in short bursts coinciding with the LA-cell system information transmissions. The terminal could also repeatedly and consistently miss a particular part of SA-cell system information even if the SA-cell system information is transmitted substantially continuously. In order to avoid such situations, preferably, the SA-cell and the LA-cell would synchronize transmission of their respective system information so that the repetition rate of SA-cell system information transmission differs from the repetition rate of LA-cell system information. With such synchronization, the part of the SA-cell system information that the terminal may miss would not be repeatedly and consistently the same part of the SA-cell system information but would shift along the SA-cell system information. This could be realized, for example, by selecting an SA-cell system information repetition time that is either shorter or longer than the LA-cell system information repetition time by a time that corresponds to the (presumably short) duration of the LA-cell system information transmission for an active terminal (i.e. the duration of a second period). Alternative solutions are also possible, such as a terminal skipping a second period and keeping its radio interface configured to SA-cell in order to receive and obtain the SA-cell system information or a terminal explicitly requesting, e.g. via the dedicated channel used for the exchange of user data, the SA-cell to provide some specified SA-cell system information to the terminal, e.g. again via the dedicated channel used for the exchange of user data, in which case applying options #2 and #5 of solution #1 may be particularly advantageous.

Because an SA-cell may have a coverage area that is, at least partially, overlapped by the coverage area of multiple LA-cells, in this configuration, it is not required that LA-cells nearby each other synchronize their LA-cell system information transmission to occur substantially simultaneously. A terminal may indicate and/or command an interruption of the SA-cell downlink user data transmission corresponding to the period in which the LA-cell (i.e., the particular LA-cell the terminal desires to monitor) transmits its LA-cell system information. However, in an embodiment, synchronized LA-cell system information transmission may still be implemented. Such an implementation may be advantageous for the terminal because no different interruption periods need to be specified for different LA-cells.

Most Flexible Configuration

This configuration largely corresponds to the "more flexible" configuration described above, where the start and the end of an SA-cell downlink user data interruption (i.e., pause and resume downlink user data transmission) is specified by the active terminal moment-by-moment.

In one embodiment, the terminal may send a command to pause the SA-cell downlink user data transmission without specifying a time instant or with specification of a particular time instant in the future to which the command applies. The SA-cell receiving the command may be configured to interpret a command without time specification as to relate to the current moment, i.e. to be applied immediately or as soon as reasonably possible. For example, after receiving such a command for an immediate pause, the SA-cell may be configured to complete e.g. the current transmission block or frame of user data, and then cease any further transmission to that terminal. After receiving a command for an immediate resume, the SA-cell may be configured to immediately resume transmission to that terminal.

In another embodiment, the terminal may send a command to pause the SA-cell downlink user data transmission at some specified time. An SA-cell receiving a time-specified pause command may be configured to interpret the command as that SA-cell transmission to that terminal must be ceased at the specified time at the latest. A time-specified resume command indicates that the SA-cell may resume transmission to that terminal from the specified time at the earliest.

Being able to specify pause and resume times for SA-cell downlink transmission on a moment-by-moment basis provides the terminal with additional flexibility to let SA-cell transmission resume as soon the terminal has performed its LA-cell operations and without having to wait for the end of the LA-cell system information transmit period. A person skilled in the art would immediately realize how to adapt the above description for the more flexible configuration to allow the start and end of SA-cell downlink user data transmission to be specified on moment-by-moment basis, and therefore, in the interests of brevity, that description is not repeated here.

Solution #3: LA-Cell Distributes LA-Cell System Information and SA-Cell System Information in an Energy-Efficient Network In the context as illustrated in FIGS. 6 and 7 and described above, the terminal 35 is first assumed to be an idle terminal which does not exchange user data via the SA-cells 33, 34, and is camping on the LA-cell 32. The terminal 35 may also become active where it would exchange user data with the SA-cell 34 via a data connection established between the terminal 35 and the SA-cell 34 for that purpose, e.g. by using a dedicated channel. Embodiments of solution #3 address the problem of the terminal 35 obtaining SA-cell system information comprising system information regarding at least the SA-cell 34 and LA-cell system information regarding the LA-cell 32, as well as, possibly, system information regarding other SA-cells and other LA-cells in the network 30 which may be relevant for the terminal 35.

Embodiments of this solution are based on the idea that an LA-cell, e.g. the LA-cell 32, may be used to transmit LA-cell system information as well as SA-cell system information for at least some of the SA-cells possibly relevant for the terminal in the coverage area of the LA-cell. Solution #3 may be separated into two main embodiments, illustrated in FIGS. 11 and 12, respectively. In the first embodiment, the LA-cell 32 uses a broadcast/common channel to transmit all of the system information for the terminals. In the second embodiment, the LA-cell 32 uses one or more dedicated signalling channels for transmitting at least some of the system information to individual terminals. These embodiments are now described in greater detail.

Using a Broadcast/Common Channel

Figure 11:
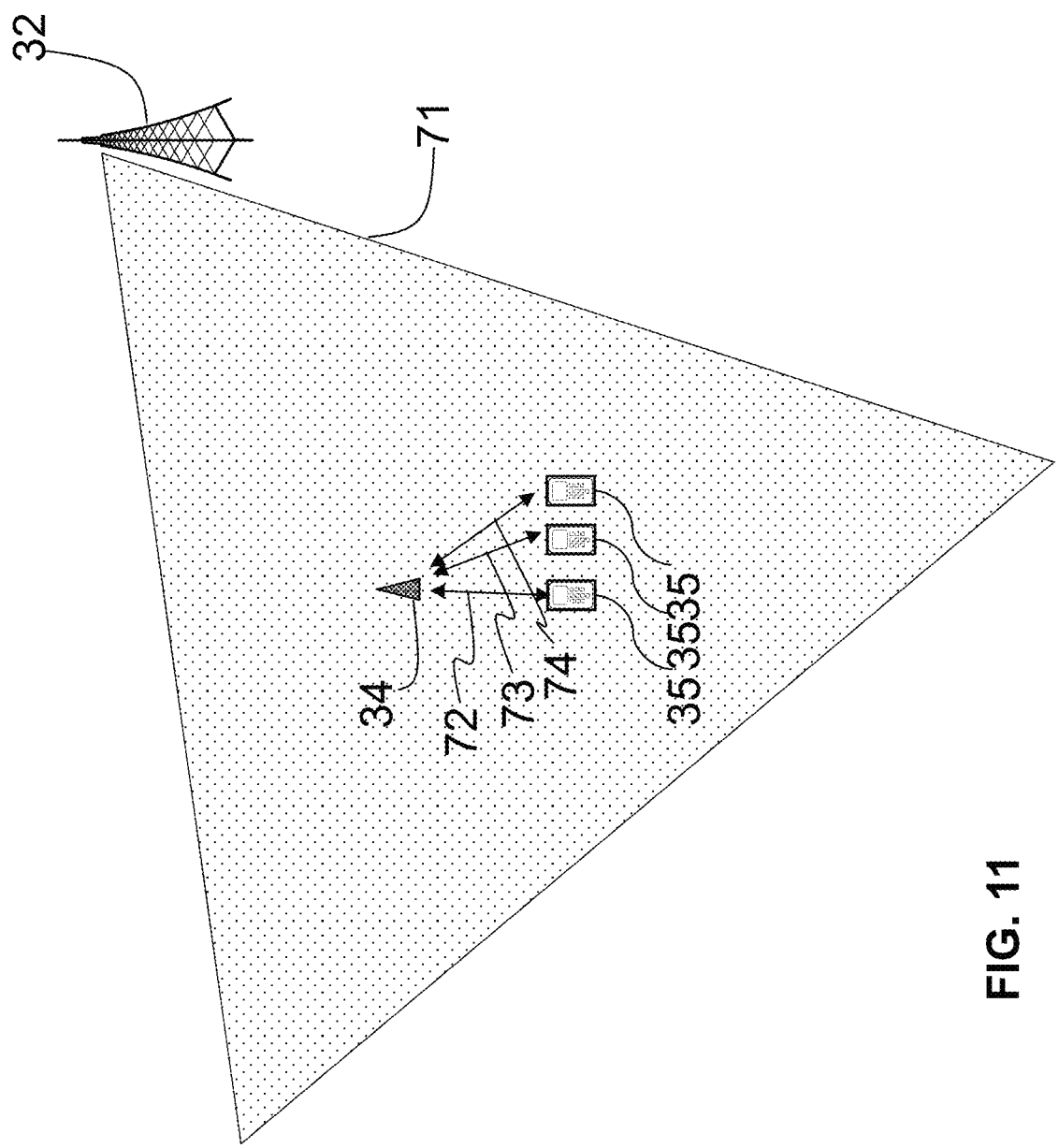
FIG. 11 is a schematic illustration of an LA-cell providing both LA-cell system information and SA-cell system information to a terminal, according to one embodiment of the present invention.

FIG. 11 is a schematic illustration of an LA-cell providing both LA-cell system information and SA-cell system information to a terminal, according to one embodiment of the present invention. The embodiment shown in FIG. 11 illustrates that the LA-cell 32 transmit its system information as well as the system information for one or more SA-cells relevant for the terminal 35 via broadcast channel 71. An idle terminal then needs only to enable its LA-cell radio interface, at least for the duration the LA-cell system information broadcast channel is monitored. This enables an idle terminal to acquire all system information for the LA-cell and for all SA-cells possibly relevant in the LA-cell's coverage area. An idle terminal may store the acquired system information and also keep it up to date. An idle terminal may, further, use the stored system information for a particular SA-cell when establishing a data session with the particular SA-cell. Such operation of the terminal is supported by any one of the terminal configurations (i), (ii), and (iii), described above.

Each of the active terminals exchanging user data with the SA-cell 34 via dedicated data channels 72, 73, and 74, shown in FIG. 11, may further be configured to monitor the system information broadcasted by the LA-cell 32. The terminal 35 may be configured to monitor the LA-cell and SA-cell system information broadcasted by the LA-cell 32 either periodically or upon receiving a trigger to do so.

For the embodiment of solution #3 illustrated in FIG. 11, two terminal configurations are envisaged.

Using terminal configuration (i) described above, an active terminal is configured to use its SA-cell radio interface to exchange user data via the SA-cell 34, possibly continuously and/or to the extent needed for the user data exchange. The terminal is configured to occasionally enable its LA-cell radio interface for a relatively short period of time, e.g. periodically or upon receiving a trigger to do so, in order to monitor the LA-cell system information broadcast by the LA-cell 32, the broadcast channel 71 comprising LA-cell and SA-cell system information. One advantage of such configuration is that the exchange of user data via the SA-cell may continue uninterrupted. The terminal, however, needs to support two radio interfaces simultaneously, at least for a short period of time, which results in higher hardware complexity.

Using terminal configuration (ii), an active terminal may be configured to alternate between the two radio interfaces. For the larger part of the time, the terminal has the SA-cell radio interface enabled to support the exchange of user data via the SA-cell 34. The LA-cell radio interface is then disabled. For the smaller part of the time, the terminal has only the LA-cell radio interface enabled in order to monitor the LA-cell system information broadcast channel 71 comprising LA-cell and SA-cell system information. The SA-cell radio interface is then disabled.

In the broadcast channel 71 transmitted by the LA-cell 32, the SA-cell system information may be grouped per SA-cell or group of SA-cells. For a higher energy efficiency of system information distribution, the LA-cell 32 may be configured to transmit the SA-cell system information only when and to the extent needed, e.g. only for those SA-cells that are active or are shortly to be activated. In order to speed up establishment of a data session via an as yet inactive SA-cell, however, the LA-cell 32 may be configured to transmit the system information of all SA-cells, e.g. including an indication about the SA-cell's activation status. In this manner, both a terminal in idle mode and a terminal in active mode are able to acquire, store and keep up-to-date the system information for their respective LA-cell and SA-cells by only monitoring the LA-cell's broadcast channel. Since the system information can be made available to the terminal even before the terminal may need this information, this approach allows speeding up the procedure of establishing a data session via an active SA-cell, the procedure of establishing a data session via a to-be-activated SA-cell, and the procedure of making a handover from one SA-cell to another SA-cell.

To further extend the system information made available to a terminal, the set of cells for which the LA-cell 32 distributes system information may be extended further, e.g. to system information regarding neighboring LA-cells and/or to system information regarding SA-cells that are outside but near the coverage area of the LA-cell 32.

In order to allow an active terminal to devote maximum attention to the exchange of user data via the SA-cell 34, a further refinement to the embodiment illustrated in FIG. 11 is to provide a trigger signal or trigger message to an active terminal in case a relevant part of the system information is modified. Such a trigger signal or signal message may e.g. be transmitted by the network via a dedicated connection to the terminal or may be broadcasted by one or more SA-cells in the network. The trigger may optionally also indicate to which cell or cells the modification is relevant. A terminal receiving such a trigger signal or message is thus notified about a modification to some of the system information and that it may be relevant to the terminal to obtain the modified system information.

In an embodiment, an active terminal may interpret some event as a trigger, for example when the terminal performs, e.g. due to mobility, a handover from an old SA-cell to a new SA-cell and needs to obtain, update, or verify the system information of the new SA-cell. Providing a trigger to active terminals relieves the active terminals from performing regular, e.g. periodic, monitoring of the LA-cell broadcast channel for possible modifications, which could be an advantage in particular with the terminal configuration (ii).

Though not the most energy-efficient compared to other solutions, the embodiment illustrated in FIG. 11 provides an advantage that a terminal is enabled to acquire the system information of all SA-cells in the LA-cell's coverage area and to store this information for later use. Thus, in case of an idle terminal establishing a data session or an active terminal performing a handover from one SA-cell to another SA-cell, the terminal is enabled to more quickly apply the settings relevant for the SA-cell compared to a situation where the terminal typically only acquires most of the system information for the SA-cell when session establishment or handover to the SA-cell has been completed. This embodiment also enables distribution of SA-cell system information to idle terminals beforehand, i.e. before a terminal sets up a data session, even if there is no SA-cell active in the neighborhood of the idle terminal.

Using a Dedicated Channel

Figure 12:
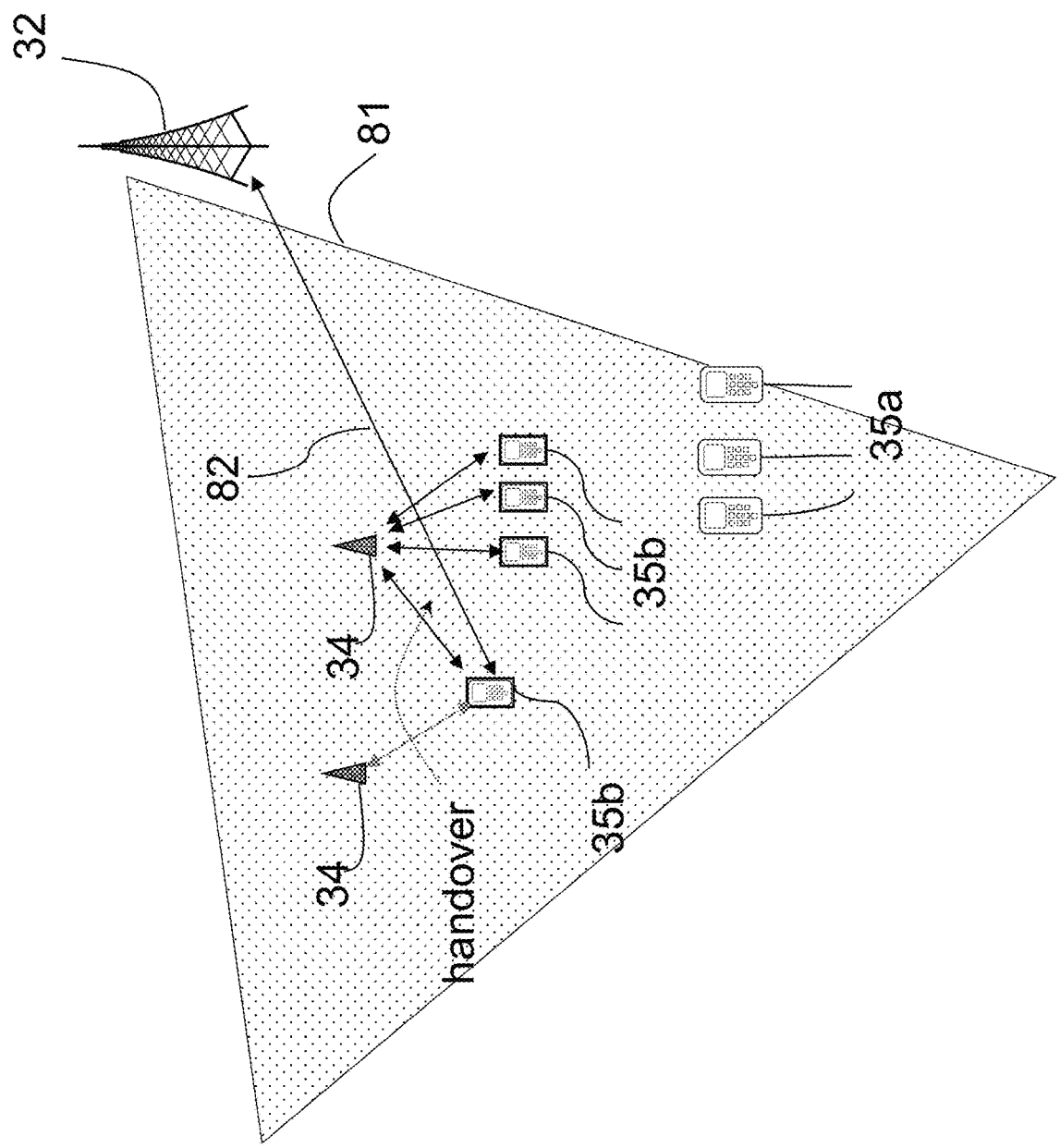
FIG. 12 is a schematic illustration of an LA-cell providing both LA-cell system information and SA-cell system information to a terminal, according to another embodiment of the present invention.

Alternatively to the embodiment described above, to avoid consuming broadcast resources in the LA-cell 32 for broadcasting system information regarding SA-cells, a dedicated signalling approach can be used. This is illustrated in FIG. 12, schematically illustrating that the LA-cell 32 transmits its system information as well as the system information regarding one or more SA-cells relevant for the idle terminals 35*a* via a broadcast channel 81, while providing SA-cell system information and/or LA-cell system information and modifications thereof to an active terminal 35*b* via a dedicated signalling channel 82.

In this solution, optionally, when the session set-up includes a dedicated signalling connection via the LA-cell 32, at session set-up the LA-cell 32 may be configured to provide, via dedicated signalling connection 82, all the relevant system information regarding the SA-cell that is selected to support the session.

Triggered by events, for example when the terminal performs, e.g. due to mobility, a handover from an old SA-cell to a new SA-cell or when the network makes a modification to some system information, such as e.g. reconfiguration of the system parameter in the SA-cell and/or LA-cell, the dedicated signalling channel 82 via the LA-cell 32 may be used to transmit the modified system information to the active terminal 35*b*.

For such an active terminal, two terminal configurations are envisioned.

Using terminal configuration (i) described above, an active terminal may use its SA-cell radio interface to exchange user data via the SA-cell 34, possibly continuously and/or to the extent needed for the user data exchange. The terminal 35*b* is configured to occasionally enable its LA-cell radio interface for a relatively short period of time, e.g. periodically or on receiving a trigger to do so, in order to support the dedicated signalling connection 82 via the LA-cell in order to receive any modifications (updates) there may be to the LA-cell system information regarding LA-cell 32 or to the SA-cell system information regarding any of the SA-cells 34. The advantage of such implementation is that the exchange of user data via the SA-cell 34 may continue uninterrupted. However, the terminal 35*b* needs to support two radio interfaces simultaneously, at least for a short period of time, which results in higher hardware complexity.

Using terminal configuration (ii) described above, an active terminal may be configured to alternate between the two radio interfaces. For the larger part of the time, the terminal has only the SA-cell radio interface enabled to support the exchange of user data via the SA-cell 34, while for the smaller part of the time the terminal has only its LA-cell radio interface enabled in order to receive any modifications (updates) there may be to the LA-cell system information regarding LA-cell 32 or to the SA-cell system information regarding any of the SA-cells 34.

Because of the use of a dedicated signalling connection, the embodiment illustrated in FIG. 12 is expected to be more energy-efficient than that of FIG. 11. In addition, this embodiment may have advantages other than those related to energy efficiency of system information distribution. For example, consider that a mobile terminal may have to frequently handover to a different SA-cell and that in each handover procedure there is a possibility of failure, possibly losing all contact between the network and the terminal. In such a scenario of frequent and error-prone handovers, it may be very attractive to have a stable and consistent signalling connection via the LA-cell 32, via which signalling connection a failed handover may be quickly repaired. Then, it may make sense to provide the terminal with the required SA-cell system information parts via the LA-cell's signalling connection, as described above. All additional savings associated with a dedicated connection apply, such as the application of power control to the dedicated signalling connection and the possibility to provide the terminal with system information regarding only relevant SA-cells. The lower energy efficiency of a typically, but not necessarily always, larger distance, in terms of path loss, between the terminal and the LA-cell than between the terminal and the SA-cell may then be outweighed by the stability and reliability of the LA-cell signalling connection.

Solution #4: SA-Cell Distributes LA-Cell System Information and SA-Cell System Information in an Energy-Efficient Network Similar to solution #3, in this solution, in the context as illustrated in FIGS. 6 and 7 and described above, the terminal 35 is first assumed to be an idle terminal which does not exchange user data via the SA-cells 33, 34, and is camping on the LA-cell 32. The terminal 35 may also become active where it would exchange user data with the SA-cell 34 via a data connection established between the terminal 35 and the SA-cell 34 for that purpose, e.g. using a dedicated channel. Embodiments of solution #4 address the problem of the terminal 35 obtaining SA-cell system information comprising system information regarding at least the SA-cell 34 and LA-cell system information regarding the LA-cell 32, as well as, possibly, system information regarding other SA-cells and other LA-cells in the network 30 which may be relevant for the terminal 35.

Embodiments of this solution are based on the idea that an SA-cell, e.g. the SA-cell 34, may be used to transmit SA-cell system information as well as LA-cell system information for at least some of the LA-cells possibly relevant for the terminal in the coverage area of the SA-cell. Solution #4 may be separated into two main embodiments, illustrated in FIGS. 13 and 14, respectively. In the first embodiment, the SA-cell 34 uses a broadcast/common channel to transmit all of the system information for the terminals. In the second embodiment, the SA-cell 34 uses its dedicated channels with the active terminals for transmitting at least some of the system information to individual terminals. These embodiments are now described in greater detail.

Using a Broadcast/Common Channel

Figure 13:
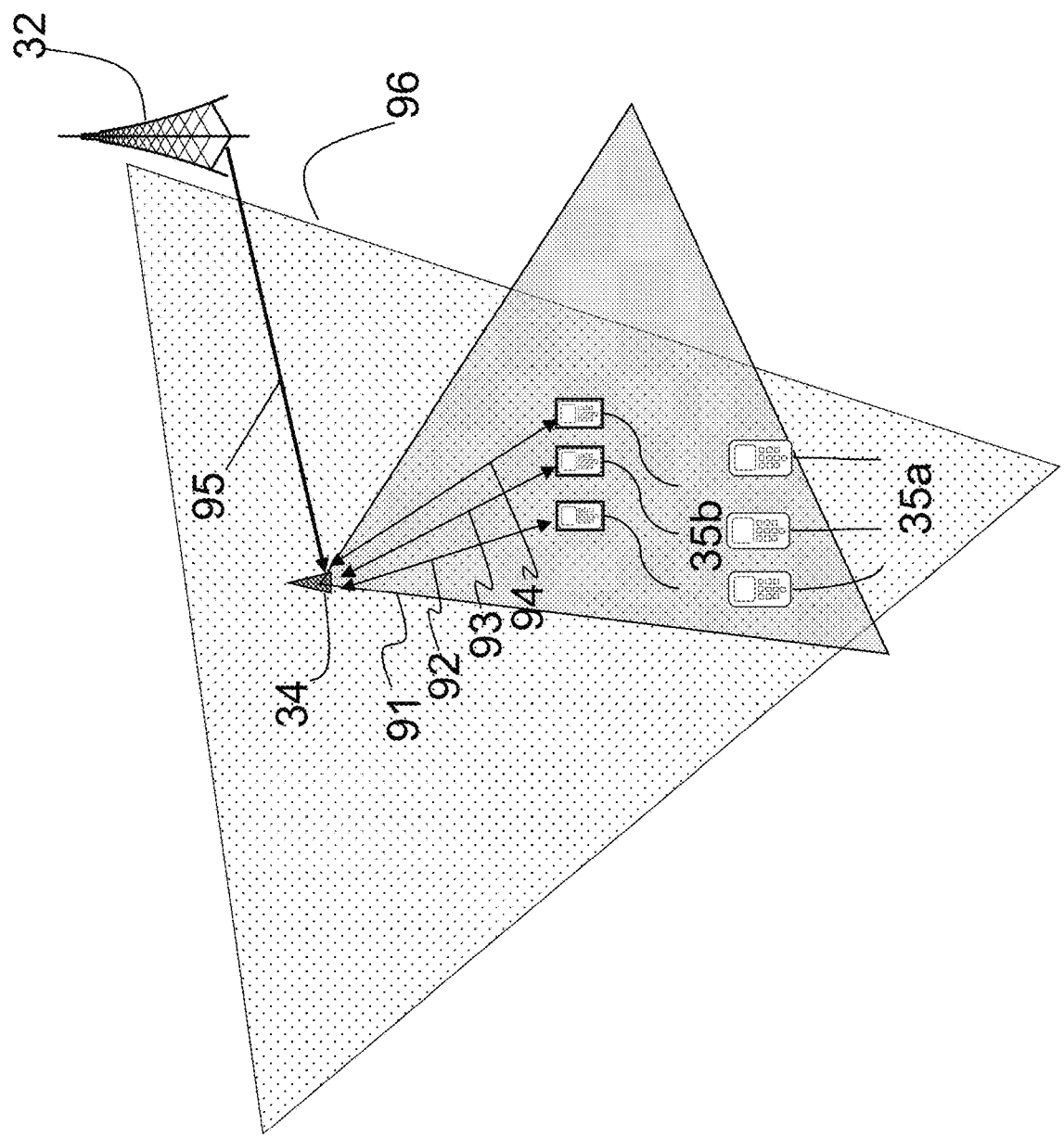
FIG. 13 is a schematic illustration of an SA-cell providing both SA-cell system information and LA-cell system information to a terminal, according to one embodiment of the present invention.

FIG. 13 is a schematic illustration of an SA-cell providing both SA-cell system information and LA-cell system information to a terminal, according to one embodiment of the present invention. The embodiment shown in FIG. 13 illustrates that the SA-cell 34 transmit its system information as well as the system information for one or more LA-cells relevant for the active terminals 35*b* via a broadcast channel 91 (in FIG. 13 illustrated as a grey triangle). Optionally, the SA-cell 34 may also include system information regarding neighboring SA-cells into the broadcast channel 91. As also shown in FIG. 13, the SA-cell 34 also has established data connections 92, 93, and 94 (e.g. via a dedicated channel), with each of the active terminals 35*b*.

In case there is a modification in the LA-cell system information of an LA-cell, the LA-cell is configured to notify the modification to all SA-cells which may be relevant to the LA-cell's coverage area, as shown with an arrow 95 in FIG. 13. Such a notification may be provided e.g. via the access network interface analogous to e.g. the X2 interface in LTE. The SA-cell 34 receiving such a notification will then broadcast a notification of modified system information and the modified LA-cell system information via the broadcast channel 91. In case the SA-cell 34 also broadcasts system information of another (e.g. neighboring) SA-cell, the same applies to the modified system information of a neighboring SA-cell, i.e. the other SA-cell is configured to notify the relevant (e.g. neighbor) SA-cells (not shown in FIG. 13) and the SA-cell 34 will then broadcast a notification of modified system information and the modified SA-cell system information regarding the another SA-cell via the broadcast channel 91.

An active terminal 35*b* receiving a notification of modified system information obtains the modified system information regarding the LA-cell and/or regarding the another SA-cell via the broadcast channel 91 of the serving SA-cell 34.

Because of the, typically, much shorter distances between and SA-cell and a terminal compared to the distances between an LA-cell and the terminals, the embodiment illustrated in FIG. 13 is very attractive from the view point of energy efficiency. However, in order to support idle terminals 35*a*, at least some of the LA-cell system information, e.g. the LA-cell network, the LA-cell identity, various parameters related to the LA-cell broadcast channel, the LA-cell neighbor cell list, etc., needs to be transmitted by the LA-cell 32 itself, as shown with a broadcast channel 96. Thus, this gain in energy-efficiency applies mostly to the part of the LA-cell system information that is relevant only for active terminals, such as e.g. handover parameters.

In an embodiment, the LA-cell system information part relevant for idle terminals may also be transmitted by the SA-cell 34, which provides an advantage of this information being available to the active terminal 35*b* for a very quick cell search and/or cell re-selection after concluding the data session. However, this embodiment may result in duplicate transmission of this LA-cell system information, somewhat reducing the energy efficiency gain.

An SA-cell broadcasting at least some LA-cell system information of one or more LA-cells with which it shares some coverage area may have an additional advantage of providing an active terminal with information regarding the relevant LA-cell(s) without requiring the terminal to use its LA-cell radio interface. For example, when the SA-cell 34 would broadcast some system information for a single LA-cell, an active terminal receiving this system information may conclude that, when it would conclude the data session, it would almost certainly find itself re-camping on that particular LA-cell.

In another example, when the SA-cell 34 is e.g. the SA-cell to which the active terminal was handed over, and the SA-cell 34 broadcasts some system information regarding two LA-cells (i.e., the LA-cell it already was associated with and a 'new' LA-cell), then the terminal may conclude that, when it would conclude the data session, it would almost certainly find itself to make a selection between those sole two prime candidates for re-camping. For terminal configuration (i) or (ii), described above, transmission of the LA-cell system information for the two LA-cells may trigger the terminal to perform measurements on those particular LA-cells. The information in the terminal's LA-cell neighbor cell list can even be ignored, because the SA-cell 34 provides more detailed information about the most relevant neighboring LA-cell(s). While providing all system information for those (possibly multiple) LA-cells may not be the most energy efficient from the narrow point of view of distributing the LA-cell's system information, it may nevertheless be beneficial for a terminal with terminal configuration (ii) because doing so may significantly reduce the time period for which the, typically low data rate, LA-cell radio interface needs to be enabled. For terminal configuration (iii), described above, the terminal only needs to acquire the LA-cell system information distributed by the SA-cell in which it concludes its data session. The number of LA-cells for which system information is distributed by a given SA-cell is likely to be more limited, e.g. one, two, or three LA-cells, thus speeding up the cell search and/or cell re-selection procedure for the terminal, because it already obtained the relevant system information for these LA-cells.

Using a Dedicated Channel

Figure 14:
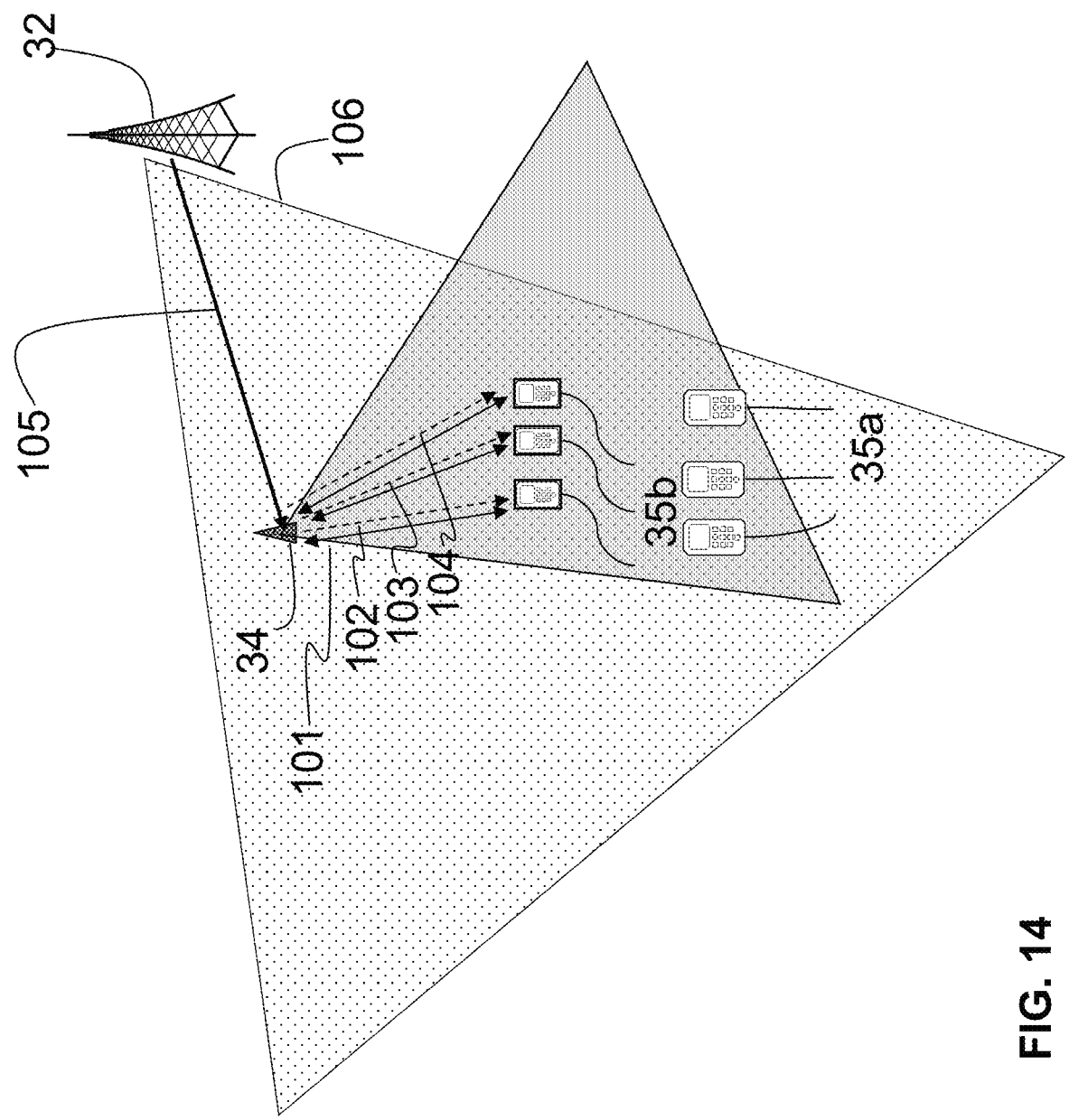
FIG. 14 is a schematic illustration of an SA-cell providing both SA-cell system information and LA-cell system information to a terminal, according to another embodiment of the present invention.

Alternatively to the embodiment described above, to avoid consuming broadcast resources in the SA-cell 34 for broadcasting system information regarding the LA-cell(s), a dedicated signalling approach can be used. This is illustrated in FIG. 14, schematically illustrating that the SA-cell 34 transmits LA-cell system information or a modification regarding that information and, optionally, also SA-cell system information regarding other (e.g. neighboring) SA-cells and modifications thereof, to the active terminals 35*b* via the dedicated signalling channels 102-104 established with these terminals, shown in FIG. 14 as solid arrows for transmission of user data via the dedicated channels, similar to channels 92-94 of FIG. 13, and additional dashed arrows for transmission of the system information and/or modification thereof via the dedicated signalling channels 102-104. The remaining procedure is similar to that described for the embodiment illustrated in FIG. 13. Namely, a broadcast channel 101 (in FIG. 14 illustrated as a grey triangle) is used by the SA-cell 34 to broadcast its SA-cell system information for the active terminals 35*b*, similar to the broadcast channel 91 described above. In case there is a modification in the LA-cell system information of an LA-cell, the LA-cell is configured to notify the modification to all SA-cells which may be relevant to the LA-cell's coverage area, as shown with an arrow 105 in FIG. 14, similar to the notification 95 described above. The broadcast channel 106 for the LA-cell 32 to transmit at least some of the LA-cell system information, e.g. the LA-cell network, the LA-cell identity, various parameters related to the LA-cell broadcast channel, the LA-cell neighbor cell list, etc., in order to support idle terminals 35*a* is similar to the broadcast channel 96 described above.

In case an active terminal does not need the LA-cell system information before conclusion of the session and resuming to idle mode, e.g. if for an active terminal no LA-cell handover is foreseen, it is even more efficient for the SA-cell to refrain from transmitting LA-cell system information modifications and/or refrain from providing indications of moving into another LA-cell coverage area until at conclusion of the session. Then, for example as part of the data connection release procedure, it suffices that only that SA-cell provides the terminal with the most recent LA-cell system information via the corresponding dedicated signalling channel 102-104. In this manner, it may be avoided to transmit possibly numerous LA-cell system information modifications and/or indications of modified LA-cell coverage area while the terminal is still active and not actually needs such LA-cell system information. Because the dedicated signalling channels 102-104 are assumed to support a high bit rate, the transfer of this LA-cell system information can be completed without significant delay compared to the situation that each modification is transmitted immediately to the terminals 35*b*.

The embodiment illustrated in FIG. 14 is expected to be the most energy-efficient, considering that using a dedicated channel is more energy-efficient than a broadcast channel and considering that an SA-cell has only small size and that, therefore, it is less likely that more than a single terminal receiving a broadcast or common channel will benefit from the transmitted system information. The additional advantages as described above for the use of broadcast/common channel embodiment as shown in FIG. 13 also apply to this embodiment.

Embodiments of the solutions #3 and #4 described above may also be combined. For example, embodiments of the solution #3 could be used for distributing appropriate SA-cell and LA-cell system information for idle terminals, while embodiments of the solution #4 could be used for distributing appropriate SA-cell and LA-cell system information for active terminals. Namely, an LA-cell may be configured to transmit appropriate SA-cell and LA-cell system information for terminals in the idle mode and an SA-cell may be configured to transmit appropriate SA-cell and LA-cell system information for terminals in the active mode.

Furthermore, as already described above, embodiments described in association with solution #1 may be advantageously applied to the SA-cells and LA-cells distributing SA-cell and/or LA-cell system information in accordance with solutions #2-4.

Various embodiments of the invention may be implemented as program products for use with a computer system. The program(s) of the program product define functions of the embodiments (including the methods described herein)

and can be contained on a variety of, preferably non-transitory, computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory, flash memory) on which alterable information is stored. The computer program may be run on the processors described herein.

What is claimed is:

1. In a wireless access network comprising at least a small area cell (SA-cell) optimized for data exchange with which a terminal in an active mode is configured to have an established data connection and a large area cell (LA-cell) on which the terminal in an idle mode is configured to camp, a method for the terminal to obtain at least LA-cell system information associated with the LA-cell and/or the network it operates in and SA-cell system information associated with the SA-cell and/or the network it operates in, the terminal comprising an SA-cell radio interface and an LA-cell radio interface, the method comprising:
when the terminal is in the active mode and the SA-cell radio interface of the terminal is enabled, and the LA-cell radio interface is disabled, the terminal receiving at least a first part of the SA-cell system information and at least a first part of the LA-cell system information from the SA-cell via the SA-cell radio interface.

2. The method according to claim 1, further comprising:
when the terminal is in the active mode and the SA-cell radio interface of the terminal is enabled, the terminal receiving, via the SA-cell radio interface, at least a second part of SA-cell system information regarding the SA cell and/or at least a part of SA cell system information regarding at least one of one or more other SA-cells in the wireless access network.

3. The method according to claim 1, further comprising:
when the terminal is in the idle mode and an LA-cell radio interface of the terminal is enabled, the terminal receiving at least a second part of the LA-cell system information.

4. The method according to claim 3, further comprising:
when the terminal is in the idle mode and the LA-cell radio interface of the terminal is enabled, the terminal receiving at least a second part of the SA-cell system information from the LA-cell via the LA-cell radio interface.

5. The method according to claim 1, further comprising:
when the terminal is in the active mode and the SA-cell radio interface of the terminal is enabled, the terminal receiving at least a part of LA-cell system information regarding at least one of one or more other LA-cells in the wireless access network from the SA-cell via the SA-cell radio interface.

6. The method according to claim 1, further comprising disabling the SA-cell radio interface when the LA-cell radio interface is enabled and disabling the LA-cell radio interface when the SA-cell radio interface is enabled.

7. A terminal comprising means for performing the steps of claim 1.

8. A non-transitory computer readable medium comprising software code portions configured, when executed by a processor, for performing the steps of claim 1.

9. An SA-cell configured for use in the method according to claim 1, the SA-cell being configured at least for:
obtaining the at least the first part of the LA-cell system information from the LA-cell or from a network management entity of the wireless access network; and
transmitting the at least the first part of the LA-cell system information and the at least the first part of the SA-cell system information.

10. The SA-cell according to claim 9, wherein at least a part of the at least the first part of the LA-cell system information and/or the at least the first part of the SA-cell system information is transmitted repeatedly during a first time period adjacent to a second time period during which no part of the LA-cell system information and no part of the SA-cell system information is transmitted.

11. The SA-cell according to claim 10, wherein the second time period is at least as long as the first time period.

12. The SA-cell according to claim 9, wherein at least one portion of the at least the first part of the LA-cell system information and/or the at least the first part of the SA-cell system information is transmitted upon the SA-cell receiving a trigger from the terminal, from the LA-cell, from a further node in the wireless access network, and/or from a network management entity of the wireless access network.

13. The SA-cell according to claim 12, wherein the at least one portion of the at least the first part of the LA-cell system information and/or the at least the first part of the SA-cell system information is transmitted after expiration of a predetermined delay period following receipt of the trigger.

14. An LA-cell configured for use in the method according to claim 1, the LA-cell being configured at least for:
providing the at least the first part of the LA-cell system information to at least one of the SA-cells in the wireless access network for transmission for the terminal.

* * * * *